US010755487B1

(12) United States Patent
Snibbe

(10) Patent No.: US 10,755,487 B1
(45) Date of Patent: Aug. 25, 2020

(54) TECHNIQUES FOR USING PERCEPTION PROFILES WITH AUGMENTED REALITY SYSTEMS

(71) Applicant: Facebook, Inc., Menlo Park, CA (US)

(72) Inventor: Scott Snibbe, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/986,768

(22) Filed: May 22, 2018

(51) Int. Cl.
*G06T 19/20* (2011.01)
*G06Q 50/00* (2012.01)
*G06T 19/00* (2011.01)
*G06K 9/00* (2006.01)

(52) U.S. Cl.
CPC .......... *G06T 19/20* (2013.01); *G06K 9/00288* (2013.01); *G06K 9/00624* (2013.01); *G06Q 50/01* (2013.01); *G06T 19/006* (2013.01)

(58) Field of Classification Search
CPC ....... G06T 19/20; G06T 19/006; G06Q 50/01; G06K 9/00624; G06K 9/00288
See application file for complete search history.

(56) References Cited

U.S. PATENT DOCUMENTS

2014/0108501 A1* 4/2014 Papakipos .............. G06Q 50/01
709/203
2015/0279117 A1* 10/2015 Schimke ................. G06F 16/00
345/633

FOREIGN PATENT DOCUMENTS

WO WO 2018/017353 A1 * 1/2018 ............. G06Q 30/02

* cited by examiner

*Primary Examiner* — Maurice L. McDowell, Jr.
*Assistant Examiner* — Donna J. Ricks
(74) *Attorney, Agent, or Firm* — Kilpatrick Townsend & Stockton LLP

(57) ABSTRACT

Techniques are provided to help social networking users manage their augmented reality identity. In particular, a user may customize one or more perception profiles, each of which specifying a selection and an arrangement of augmented reality elements to display over a view of the user. The user may further associate each perception profile with a relationship category that may be defined by the user. In this way, users gain more control over what image to project to different categories of people and is thereby empowered to express their identities in a context-appropriate way.

20 Claims, 10 Drawing Sheets

TECHNIQUES FOR USING PERCEPTION PROFILES WITH AUGMENTED REALITY SYSTEMS

BACKGROUND

Augmented reality (AR) technology involves modifying a view of a real-world environment (also referred to herein as a "scene") to enhance the viewer's perception. This can be done, for example, by presenting various AR elements to a user such that the AR elements are incorporated into the user's experience of a scene. By incorporating these AR elements, the user's experience of the scene may thereby become enhanced. Examples of these AR elements include computer-generated data, text, images, sounds, haptics, or the like.

AR technology may take the form of electronic devices, including wearable devices (e.g., smart eyeglasses), mobile devices (e.g., smartphones), tablets, or laptop computers. These AR devices may perform AR functions. For example, a pair of smart eyeglasses may include a transparent display capable of presenting various visual AR elements. When a user wears the smart eyeglasses, the display may be positioned in between the user's eyes and the scene that the user is viewing. As a result, the AR elements presented on the display of the smart eyeglasses may be overlaid on top of and/or incorporated into the user's view of the scene.

To illustrate, a user wearing a pair of smart eyeglasses may be sitting at a beach. While the user is looking at the ocean, the display on the eyeglasses may present a blue color filter over the user's view of the ocean to make the ocean appear to have a deeper blue color. The display may further present various data about the ocean next to the user's view of the ocean, including the ocean's name, surface area, lowest depth, temperature, etc. The pair of smart eyeglasses may also include speakers next to the user's ear that may play ambient sounds of ocean waves and birds to further add to the immersive experience.

As previously mentioned, mobile devices may similarly support AR functions. For example, a smartphone (including a camera that collects sensory data, such as imaging data, about a scene) may present a view of the scene on a screen to a user of the smartphone. The smartphone may then modify the presented view of the scene, such as by presenting a virtual object as if it was placed on top of a real surface in the environment or presenting data next to environmental objects.

By providing these AR functionalities, AR devices may facilitate social interactions. For example, an AR device may display biographical information about various people that a user might encounter. An AR device may scan a person's face, determine identification information related to the person, and thereafter display some data about that person, such as his name, profession, age, interests, and/or contact information. Such information may be obtained via a general internet search or from various social networking systems. However, although some AR functionality currently exist, they have not been widely used to facilitate social interactions.

SUMMARY

The present disclosure relates generally to augmented reality, and more particularly to managing how a person is perceived by other people using augmented reality systems.

In certain embodiments, techniques are provided to allow a person to customize how other people see or hear the person. For example, the techniques may provide a way for the person to customize different perception profiles so that the person may be perceived differently to different people or groups of people. These perception profiles may specify which AR elements are to be presented to people perceiving the person and how those AR elements are to be presented. For example, a person might want to be dressed in professional attire when viewed by a co-worker, but in casual attire when viewed by a friend.

In one embodiment, a first user may use an AR device to capture sensory data associated with a scene. Using the sensory data, a second user may be identified in the scene. Identifying the second user may include determining identification information for the second user. In one embodiment, the identification information may include a user profile from a social networking system. Using the identification information of the second user, a perception profile associated with the second user may be identified. The perception profile may specify a selection and/or an arrangement of one or more AR elements for a particular person or a group of people. The perception profile may then be sent to the AR device.

Upon receiving the perception profile, the AR device may present the one or more AR elements according to the specifications in the perception profile. Thus, the first user may view the one or more AR elements in conjunction with the first user's view of the second user. In one illustrative example, one set of AR elements may include a suit and a tie, thus giving the second user a more professional appearance. When viewed by the first user, the second user thus appears to be wearing professional attire given the AR elements overlaid onto the view of the second user.

Techniques described herein may help social networking users control and manage their identity in an augmented reality world. Specifically, users may choose how they appear when they are viewed by other people through augmented reality devices. For example, a user may customize what augmented reality elements to present and how these elements may be arranged and overlaid onto a view of the user. For example, a user may choose to appear to be wearing different clothes and accessories when they are viewed through an AR device. The user may further customize where the clothing items and accessories are positioned on the user's body.

Users may further present a different version of themselves depending on who the viewer is. For example, a user may present a different wardrobe to different viewers or different categories of viewers. Such categories may be defined by the user based on relationships defined between the user and the viewer. For example, a user may have one category comprising all of the user's coworkers and another category for the user's friends. Accordingly the user may choose to display herself as being dressed in casual attire when viewed by the user's friends and professional attire when viewed by the user's coworkers.

The present technology may be especially applicable to social networking systems having augmented reality components. Augmented reality devices, whether in the form of smart phones or smart glasses are becoming increasingly common. As AR technology continues to develop, AR devices may become ubiquitous. These AR devices may take the form of smart glasses, smart phones, and other mobile electronics. A user may be able to use these AR devices to assist them with social interactions. For example, the AR device may detect people in a scene viewed by the user. The AR device may then search the internet for information about the detected people, and present that information to the user of the AR device.

In some embodiments, an augmented reality (AR) device may be provided. The AR device may be used by a first user. The AR device may include a sensor configured to receive sensory data related to an environment, a processor, and an audio or video output device. The processor may be configured to detect a second user within the environment based upon the received sensory data.

The processor may be further configured to retrieve a perception profile for the second user from a memory. The memory may include a plurality of perception profiles for the second user. The plurality of perception profiles may be available across a plurality of social networking systems. The perception profile may be retrieved in response to the second user being determined to have a particular type of relationship with the first user. In some embodiments, determining that the first user has the particular type of relationship with the second user is based upon the received sensory data and social networking data related to the first user and the second user.

The processor may be further configured to identify one or more AR elements associated with the perception profile, where the one or more AR elements are defined by the second user. In some embodiments, an AR element of the one or more AR elements is a visual element, where the visual element is displayed over a view of the environment by the AR device. In some embodiments, an AR element of the one or more AR elements may enhance an emotive expression of the second user.

The audio or video output device may be configured to present the identified one or more AR elements. In some embodiments, the perception profile includes an arrangement of the visual element. In such embodiments, the visual element may be displayed based upon the arrangement having been customized by the second user.

In some embodiments, a method is provided. The method may include determining identification information for a first user. In such a method, the first user may be using an augmented reality (AR) device. The method may further include determining identification information for a second user, where the second user is present in an environment associated with the AR device.

The method may further include identifying a plurality of perception profiles stored for the second user. The plurality of perception profiled may be identified based upon the identification information for the second user. In some examples, each perception profile may be defined by the second user for a different relationship with the second user. The plurality of perception profiles may be available across a plurality of social networking systems.

The method may further include identifying a perception profile of the plurality of perception profiles. The perception profile may be identified based upon the identification information for the first user. In some embodiments, identifying the perception profile includes determining that the first user has a particular relationship with the second user. Determining that the first user has the particular relationship with the second user may be based upon sensory data captured by the AR device and social networking data related to the first user and the second user.

The method may further include identifying one or more AR elements associated with the perception profile. The one or more AR elements may be defined by the second user. An AR element of the one or more AR elements may be a visual element, where the visual element is displayed over a view of the environment by the AR device. In some embodiments, an AR element of the one or more AR elements may enhance an emotive expression of the second user.

The method may further include causing the one or more AR elements to be presented to the first user via the AR device. In some embodiments, the perception profile may include an arrangement of the visual element, where the visual element is displayed based upon the arrangement having been customized by the second user.

In some embodiments, the method may further include identifying a second perception profile of the plurality of perception profiles. The second perception profile may be identified based upon updated identification information for the first user. The second perception profile may be associated with a second relationship with the second user, where identifying the second perception profile includes determining that the first user has changed to have the second relationship with the second user rather than the particular relationship. In such embodiments, the method may further include identifying one or more second AR elements associated with the second perception profile and causing the one or more second AR elements to be presented to the first user via the AR device.

TERMS

Figure 1:
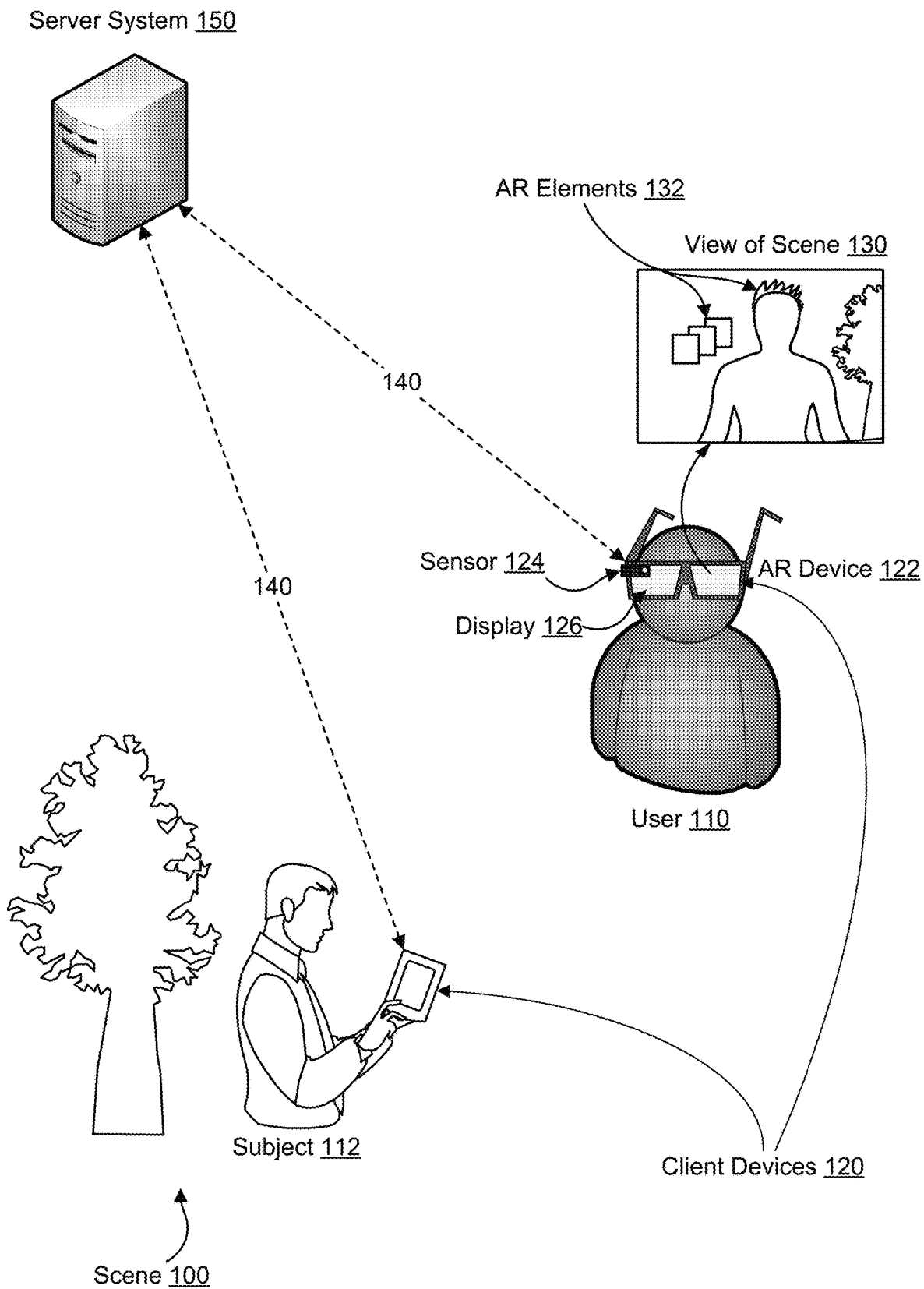
FIG. 1 is a block diagram illustrating how a user of an augmented reality device may use the device to see an augmented view of a scene comprising a subject according to embodiments of the present technology.

An "augmented reality device" may refer to any device capable of modifying a view of a scene to enhance a user's perception of the scene.

A "subject" as used herein in this disclosure may refer to a person that is being viewed by another person via a augmented reality device.

A "user" may refer to a user of a social networking system, an augmented reality device, a client device, or any other devices, systems, and/or technologies.

A "non-user" may refer to a person who is not a user of a social networking system.

A "scene" (sometimes referred to as an environment) may refer to a portion of a real world environment that may be viewed by a user using an augmented reality device.

An "augmented reality element" may refer to something that enhances a view of a scene, such as a visual overlay item, that may be displayed using an augmented reality device.

DETAILED DESCRIPTION

As augmented reality (AR) devices become increasingly ubiquitous and the capabilities of AR technology continue to expand, people's digital presence may become more widely available as well. One aspect of this is that AR devices may make it easier for users of the AR devices to access information about the people they encounter by displaying data, visual enhancements, and/or other AR elements about people that a user may be viewing (people being viewed through AR devices are herein referred to as "subjects"). Conventionally, in order to find biographical information about a subject, the user had to know the subject's name, manually input the name into a search engine, and browse through the search results to find the information they are looking for. In contrast, an AR device may automatically perform a series of steps, including scanning a scene, detecting a subject within the scene, identifying who that subject is, retrieving information about the subject, and displaying that information to the user, wherein all of these steps may be performed automatically by the AR device without requiring user input. The search may retrieve information from what is generally available on the Internet or more specifically from a social networking system.

While some AR devices may be configured to only present biographical information to the person using the AR device, other AR devices may be configured such that they do not prevent other people nearby from viewing the same presented biographical information. Still other AR devices may be configured to broadcast the biographical information. The result is that in such an environment, people's personal information may be presented a lot more frequently in a variety of public or private settings.

In addition to presenting information, AR devices may also overlay other types of AR elements over a view of a person. These AR elements, may involve multiple sensory channels, including visual, auditory, and haptic AR elements that add to the intensity of the viewing experience. Altogether, these AR elements may make a view of a person through an AR device highly memorable.

The AR displays that may be overlaid onto a view of a person may influence how the person is perceived by the people around them. Information about the person's interests, for example, may help users identify areas of common interests more quickly and thereby help to build new relationships. On the other hand, biographical information displayed about a person may also negatively impact that person's reputation. Thus, AR devices may play an important role in facilitating social interactions, such as by helping people more quickly find others with similar interests, or by potentially deterring social interaction when a person is portrayed in a undesired light through an AR device.

There is therefore a strong need among users to control and manage their identity in this AR world, specifically how they may wish to present themselves to the world and how they want to be perceived. In addition, the users may want to be able to tailor their AR presentation to different audiences so that different displays are presented depending on who is viewing, or which category of people is viewing. AR can also be used as a tool for self-expression. Currently, AR technology is rather rudimentary. They simply display some data. But we want them to do more, to shape how we are perceived by other people and as tools for us to express who we are and how we want to interact with other people. Finally, AR technology may be used to augment social interactions, by taking into account of people's relationships when determining how to augment social interactions and AR displays of people.

A social networking system providing tools to give users more control over their identities may thus become a more desirable system and create a safer environment in which people may be more willing to share and express themselves on their own terms. A social networking system that has such functionality would have a competitive advantage in this AR world, and be more able to compete against other social networking systems to acquire and retain users. As a result of these tools, a social networking system may be able to acquire more users and create a more valuable product that draws users to spend more time on the social networking system.

Although the present disclosure is discussed with respect to AR technology, it is understood that the technology discussed within the present disclosure may also be applied to other platforms including virtual reality platforms and conventional social networking systems that do not have AR or VR components.

I. Augmented Reality Device

FIG. 1 illustrates an exemplary augmented reality device 122 and how it may enhance a view 130 of a scene 100 according to embodiments of the present technology. An augmented reality device 122 may be a wearable device, such as a pair of smart eyeglasses, or a mobile device, such as a smartphone, tablet, or laptop computer, or any other augmented reality device 122 capable of performing augmented reality functions that may enhance a view 130 of a scene 100. An augmented reality device 122 may comprise a sensor 124, a processor, a communications device, and a display 126, all of which may be communicatively coupled to each other. The sensor 124 may scan the scene 100 comprising a subject 112 and collect sensory data about the scene 100. The sensory data may then be analyzed by the processor and sent to a server system 150 by the communications device. The communications device may then receive data sent by the server system 150 that may help the processor generate a view 130 of the scene 100 on the display 126. The view 130 of the scene 100 may comprise various augmented reality elements 132 that may enhance the user's 110 view of the subject. Alternative embodiments may involve other variations on which system components, such as the augmented reality device 122, computer systems, or server systems, handle each of the various data processing and transfer tasks described above.

1. Sensor

The sensor 124 may be a camera, a radar device, a light ranging device, a Light Detection and Ranging (LIDAR) device, or any other sensor capable of scanning a scene and collecting sensory data about the scene. In one embodiment, the sensor 124 may be integrally connected to the rest of the augmented reality device 122. In alternative embodiments, the sensor 124 may also be separate from the rest of the augmented reality device 122 while being communicatively connected to the other components of the augmented reality device 122. In one embodiment where the augmented reality device 122 may be pair of smart eyeglasses, the sensor 124 may be positioned near the eyes of the user 110 so that the sensor 124 may be positioned to gather sensory data about the portion of the scene 100 that is within the user's 110 field of view. In alternative embodiments, the user 110 may be able to direct which way the sensor 124 should face and therefore which portion of the scene 100 the sensor 124 should scan. Thus, the sensor 124 may collect sensory data and display a view 130 corresponding to a portion of the scene 100 that is not tied to the user's 110 field of view.

A. Sensory Data

The sensory data collected by the sensor 124 may be arranged in various formats. In one embodiment, the sensory data may comprise a series of two-dimensional images taken of the scene 100 at regular time intervals. For example, the sensor 124 may capture thirty images of the scene 100 every second. Each image may have a horizontal and a vertical dimension. Each image may further comprise a plurality of pixels, wherein each pixel may have a color, which may be represented by three color values including a red value, a blue value, and a green value, and a brightness, which may be represented by an intensity value. The pixels of each image may be arranged into a three-dimensional array, wherein a first dimension of the array corresponds to the horizontal dimension of the image, a second dimension of the array corresponds to the vertical dimension of the image, and a third dimension of the array corresponds to the number of different types of values needed to represent each pixel of the image, including the red, blue, green, and intensity values previously discussed.

In alternative embodiments, such as when the sensor 124 is a light ranging device, the sensor 124 may collect sensory data about a scene 100, wherein the sensory data may be arranged into a data structure comprising a collection of points in three-dimensional space corresponding to points on environmental surfaces in the scene. The collection of points may have a point density that measures the angular distance between each point with other adjacent points, in other words, how closely packed together the points may be. Each point may comprise an x, y, and z coordinate, as well as red, blue, and green color values, and an intensity value. The collection of points may be sent to the processor to construct a three dimensional representation of surfaces in the scene 100. The coordinates of each point may be computed by using the sensor 124 to measure a distance vector between the sensor 124 and the point, wherein the distance vector comprises a distance between the sensor 124 and the point and an angular direction value of the point relative to the sensor 124 within the coordinate system of the data structure for the sensory data.

2. Processor

Regardless of how sensory data may be represented, the sensor 124 may send the sensory data to the processor where the sensory data may be processed and analyzed. For example, the processor may arrange the raw sensory data into more organized data structures for use in further data processing. The processor may also generate metadata and log data for testing and program diagnostic purposes. It is understood that the data processing functions of the processor may be performed in conjunction with one or more additional processors comprised within the augmented reality device 122 in alternative embodiments. In addition, the processor may comprise various sub-modules that are specialized for performing various particular data processing tasks or functions. The processor may also execute instructions stored within a memory of the augmented reality device 122, or instructions received at a communications device from a server system 150 or another device via a communication channel 140.

By analyzing a sequence of sensory data collected at incremental points in time, the processor may detect the motion of people and environmental objects within the scene 100. The processor may also analyze the sensory data to detect the presence and the identity of a subject 112 within the scene 100. Although the processor may be comprised within the augmented reality device 122 in one embodiment of the present technology, the processor may also be located elsewhere in other embodiments. For example, the processor may be comprised within a desktop computer that is communicatively coupled with the augmented reality device 122 such that data received by the augmented reality device 122 are sent to the processor in the desktop computer for processing.

3. Communications Device

Data processing functions may be performed by both the processor of the augmented reality device 122 as well as the server system 150. The server system 150 may be communicatively connected with the augmented reality device 122 via one or more communication channels 140. The communications device of the augmented reality device 122 may transmit and receive data to and from the server system 150 via the communication channels 140. The processor may further be communicatively connected to the communications device of the augmented reality device 122 and therefore be able to send and receive data to and from the communications device. In one embodiment, the communication channel 140 may be a wireless communication channel such as Wi-Fi or cellular data. In alternative embodiments, the communication channel 140 may be a wired communication channel such as Ethernet or optic fiber.

It is understood that any processing steps performed by the processor may be instead performed by the server system 150 in alternative embodiments. For example, the raw sensory data collected by the sensor 124 may be directly sent to the server system 150 using the communications device via the communication channel 140 such that all of the processing and analysis of the sensory data are performed by the server system 150. The server system 150 may then send the processed sensory data back to the augmented reality device 122 to instruct the processor on what should be displayed to the user.

4. Display

The processor may control the display 126 of the augmented reality device 122 and may determine what augmented reality elements are displayed on the display 126. In one embodiment, the display 126 may be a transparent screen on a pair of smart eyeglasses that may be positioned between the user's 110 eyes and the scene 100 that the user is viewing when the eyeglasses are worn by the user 110. Alternatively, the display 126 may be the screen on a mobile electronic device, such as a smartphone or a tablet computer. It is understood that other types of displays 126 for displaying a view 130 of a scene 100 to the user 110 may also be used in alternative embodiments.

The processor may determine what to display based on data received from the server system 150. The communications device of the augmented reality device 122 may receive data from the server system 150 via the communications channel 140 and may transfer that information to the processor. The processor may then determine one or more augmented reality elements to display on the display 126 of the augmented reality device 122 based on the received data from the server system 150. For example, the data received from the server system 150 may comprise information on which augmented reality elements to display and how those elements should be arranged on the augmented reality display 126.

A. Augmented Reality Elements

The display 126 of the augmented reality device 122 may be used to display one or more augmented reality elements that may be overlaid on top of a user's 110 view of a subject 112. The augmented reality elements that may be presented to a user of an augmented reality device 122 may be directed to various sensory channels, such as visual, auditory, and haptic channels. While the display 126 of an augmented reality device 122 may be used to present visual augmented reality elements, the augmented reality device 122 may further comprise speakers and haptic feedback devices that can provide auditory and haptic augmented reality elements to the user 110. Components for providing auditory and haptic feedback may be comprised within the display 126 or may be separate from the display 126. Examples of augmented reality elements that may be displayed include numbers, text, GPS data, photos, images, visual overlays, icons, maps, webpages, Internet links, music, voice recordings, audio clips, sound effects, haptic feedback, vibrations, and/or any other augmented reality elements that may enhance a user's 110 view 130 of a scene 100.

Of particular relevance to users of a social networking system, an augmented reality element may further include elements that enhance how users 110 of the social networking system may appear to other people who are viewing the users 110 through an augmented reality device 122. Such elements include articles of clothing, accessories, voice enhancers, links to a user's social networking profiles, decorative icons, biographical information about the user 110, or any other augmented reality element that may enhance a user's 110 augmented reality appearance. For example, the display 126 of the augmented reality device 122 may overlay a formal suit over the body of a subject 112 who may be a user of a social networking system such that the subject appears to be dressed in professional attire to users viewing the subject through an augmented reality device 122 even though the subject may actually be wearing casual clothes. The processor of the augmented reality device 122 may track the movements of the subject and adjust the displayed augmented reality element accordingly so that the displayed overlay of the suit may continue to cover the subject's body even while the subject is moving. As a result, the subject 112 would appear to be wearing a suit when viewed using an augmented reality device 122.

Augmented reality elements may further comprise enhancements for a subject's emotive expression. For example, the augmented reality device 122 may display emotive icons next to a view of a subject to indicate the subject's current mood. The augmented reality device 122 may also display visual overlays that enhance a subject's 112 facial expression. For example, a mask may be applied over the face of a subject to make the subject's facial expressions more expressive. Similarly, the augmented reality device 122 may also display the subject as smiling even though the subject's actual expression may be neutral. These emotive enhancements may assist subjects with expressing their mood to augmented reality device 122 users 110 around them.

B. Maintaining Augmented Reality Elements on the Subject's Body

The augmented reality elements may be overlaid over a view of the subject's body and maintained over the subject's body as the subject moves around in the scene. In one embodiment, an augmented reality element may comprise a first anchoring point that is associated with a second anchoring point on the subject's body such that the first anchoring point is positioned to align with the second anchoring point when the augmented reality element is displayed over a view of the subject's body. For example, an augmented reality element may be a tie having an anchoring point in the center of a knot in the tie that aligns with another anchoring point in the middle of a subject's neck. As the subject moves around in the scene, the position of the anchoring point on the tie remains fixed to the anchoring point on the subject's neck so that the tie would move with the subject. Other methods of maintaining the position of augmented reality elements on the subject's body may also be used. For example, the augmented reality device 122 may receive sensory data about the subject from multiple view perspectives and use the data to construct a three-dimensional representation of the subject. The augmented reality elements overlaid on the subject may also comprise a three-dimensional model that maps onto the three-dimensional representation constructed for the subject. In this way, the augmented reality element may track the three dimensional model of the subject and appear to be in the same position and orientation as the subject when the subject is being viewed through an augmented reality device.

C. User Input

In addition to displaying augmented reality elements over a view 130 of a scene 100, the display 126 may further provide a user 110 with a graphical user interface so that the user 110 may interact with the augmented reality device 122 and the server system 150. For example, the graphical user interface may display information contained within the server system 150 and/or the augmented reality device 122. The graphical user interface may also take in inputs from the user 110 and transfer the user's 110 inputs to the processor for processing and analysis. The display 126 may be a touchscreen that is capable of receiving touch inputs from the user 110. Alternatively, the augmented reality device 122 may also use eye tracking technology to track the user's gaze and allow the user to interact with the augmented reality device 122 using their gaze. For example, a user may hold their gaze over an interface element for a predetermined period of time to indicate a selection of the interface element. In addition, the augmented reality device 122 may comprise sensors that may detect a user's movements such as hand gestures and enable the user to interact with the augmented reality device 122 using these hand gestures. The sensor of the augmented reality device 122 may further comprise a microphone for receiving audio input, which may be combined with the touch inputs received from the user 110 and sent to the processor for processing and analysis.

II. Augmented Reality Social Networking System

Figure 2:
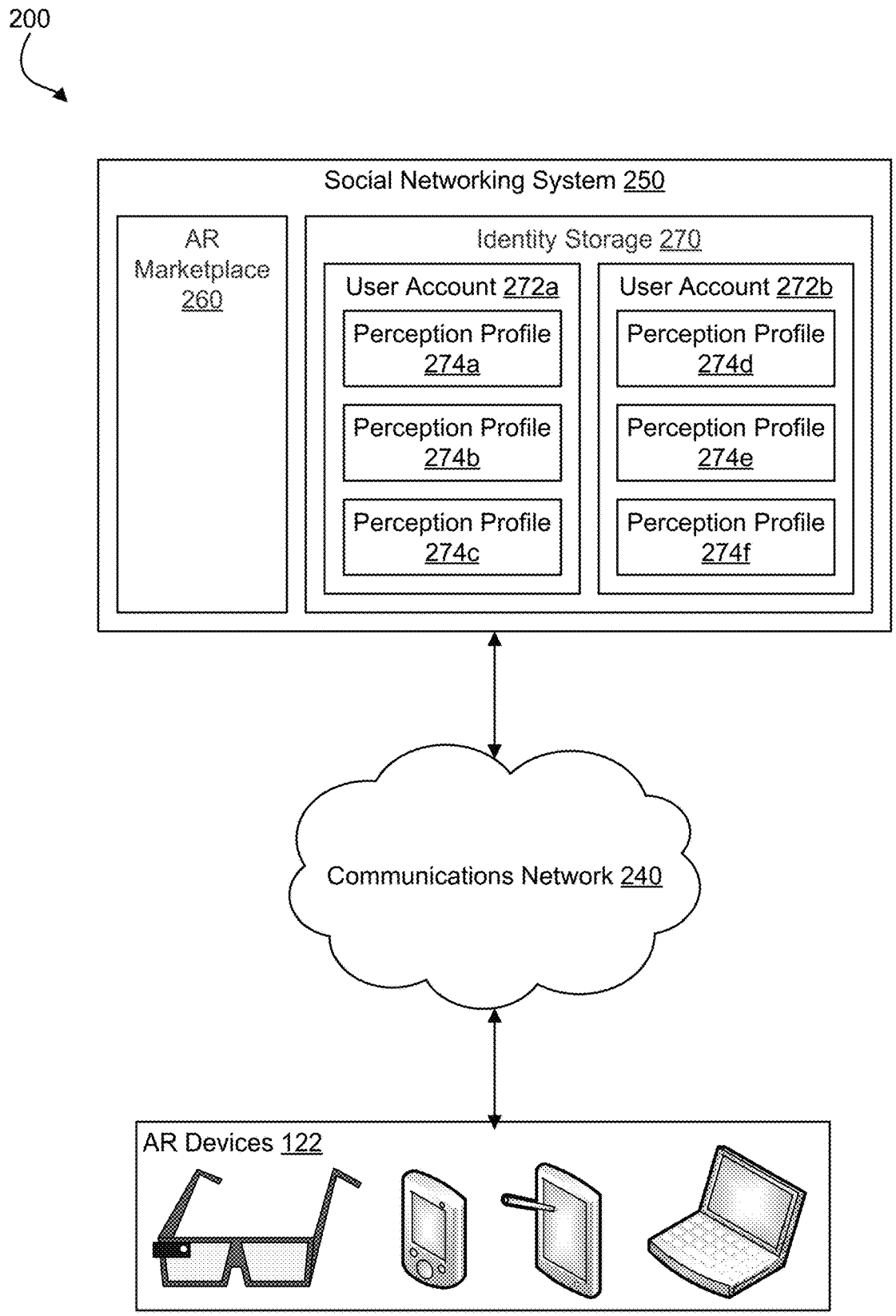
FIG. 2 is a block diagram of an augmented reality social networking system according to embodiments of the present technology.

FIG. 2 illustrates a block diagram of an augmented reality social networking system 200 according to embodiments of the present technology. The augmented reality social networking system 200 may comprise a social networking system 250, an augmented reality marketplace 260 for goods and services related to augmented reality, an identity storage 270, one or more augmented reality devices 122, and a communications network 240 connecting the one or more augmented reality devices 122 to the social networking system 250, the augmented reality marketplace 260 and the identity storage 270. The social networking system 250 may comprise a social graph connecting users, social networking data about users, and social networking content to each other. In one embodiment, the augmented reality marketplace 260 and the identity storage 270 may be comprised within the social networking system 250. In alternative embodiments, the augmented reality marketplace 260 and the identity storage 270 may be separate from the social networking system 250 and may be connected to the communications network 240 independently from the social networking system 250.

1. Social Networking System

The social networking system 250 may be hosted by one or more server systems, such as the server system 150 shown in FIG. 1. Accordingly, the social networking system 250 may be hosted on one or more computer systems within one or more data centers that may be located in a single geographical location or distributed across multiple geographical locations. Examples of social networking systems include Facebook, Twitter, LinkedIn, Instagram, WeChat, and the like. As previously described, a user 110 may access a social networking system 250 using a client device 120, such as an augmented reality device 122, which may provide the user 110 with a graphical user interface for interacting with the social networking system 250. The augmented reality device 122 may work as previously described.

A social networking system 250 may provide social networking services for one or more users 110 of the social networking system 250. For example, a user 110 of the social networking system 250 may use the social networking system 250 to connect and communicate with other users 110 of the social networking system 250. Information and content related to users 110 of the social networking system 250 may also be accessed by other people who may or may not be users of the social networking system 250.

The social networking system 250 may provide different levels of access to the system's 250 data, contents, and functions to different people, including users 110 of the social networking system 250, users 110 of augmented reality devices 122, users 110 of client devices 120, and people who are not users 110 of one or more of the above. For example, users 110 of the social networking system 250 may have a higher level of access to the social networking system's 250 contents, data, and functions than people who are not users 110 of the social networking system 250. Accordingly, certain types of information about a social networking system 250 user 110, such as the user's contact information, may be accessible to other users 110 of the social networking system 250, but not to people who are not users of the social networking system 250.

The communications network 240 may comprise one or more communication channels 140 that may connect client devices 120 and augmented reality devices 122 to the social networking system 250. Each of these communication channels 140 may be a wired connection, such as Ethernet or fiber optics, or a wireless connection, such as Wi-Fi or a cellular data network. In one embodiment, the communications network 240 may have a centralized and hierarchical tree structure that connects the social networking system 250 at a root node at the top of the tree structure to a plurality of augmented reality devices 122 at leaf nodes at the bottom of the tree structure. In such a network, each node in the network may be connected to one or more nodes at a lower level in the tree structure, but only one node at a higher level in the tree structure. In another embodiment, the communications network 240 may have a decentralized mesh structure where any node in the network may be connected to one or more other nodes. It is understood that the communication network may be structured or arranged in other ways in alternative embodiments.

A. Data and Content

The social networking system 250 may process and store various types of social networking data. Social networking data may be stored within the social networking system 250 or on an external device that is communicatively linked to the social networking system 250. Social networking data may comprise data stored within the identity storage 270, as well as data stored outside of the identity storage 270. It is understood that other arrangements for storing social networking data may also be appropriate in alternative embodiments.

Social networking data may include data about the users 110 of the social networking system 250. Such user data may include data that users 110 of the social networking system 250 may submit to the social networking system 250 about themselves, as well as data that users 110 of the social networking system 250 submit about other users 110 of the social networking system 250. User data may include biographical and personal information about users 110 of the social networking system 250, such as the users' gender, age, birthday, contact information, interests, work history, education history, and the like. User data may also include data related to user profiles, including the contents of user profiles as well as how the contents may be arranged. A user profile may comprise a collection of data about a user 110 of the social networking system 250 that may be presented to other people to provide a description of that user 110. User data may further include metadata about a user's 110 activities on the social networking system 250, such as the user's 110 time spent on the social networking system 250, the user's 110 browsing history, the user's 110 activity level, and the like. User data may further include the social networking user's 110 settings and configurations, such as the user's 110 privacy settings on who can access which portions of the user data about the user 110.

Social networking data may also include user-submitted content, which may be presented in various formats such text, documents, files, Internet links, photos, images, music, voice recordings, audio clips, videos, software applications, or any other format for presenting user-submitted content. Social networking data may further include data about the social networking system 250 itself, including data required for operating the social networking system 250.

By accessing a social networking system 250, a user 110 may use the social networking system 250 to share information with other people, including other users 110 of the social networking system 250 and people who are not users 110 of the social networking system 250. The user 110 may also use the social networking system 250 to view information shared by other users 110 of the social networking system 250.

B. User Connections

A user of the social networking system 250 may also use the social networking system 250 to connect with other users of the social networking system 250, thereby becoming "connected" with each other. Users who are connected with each other may be referred to as each other's social networking "connections." Users may choose to grant a greater level of access to the data they share to their connections than to users and non-users they are not connected with. For example, a user may want to display their name and profile photo to the public so that both users and non-users may be able to see the user's name and profile photo, but may want to display their age, birthday, and contact information only to users he or she is connected with. Thus, by connecting with other users, a user may gain greater access to information and content shared by other users of the social networking system 250.

The social networking system 250 may also store information related to the user's interactions and relationships with other concepts (e.g., users, groups, posts, pages, events, photos, audiovisual content (e.g., videos), apps, etc.). This information may be stored within the identity storage 270, as will be described in greater detail below in the Identity Storage section, or stored within the social networking system 250 outside the identity storage 270, or stored in any other configuration whether internal or external to the social networking system according to embodiments of the present technology. The social networking system 250 may store the information in the form of a social graph. The social graph may include nodes representing users, individuals, groups, organizations, or the like. The edges between the nodes may represent one or more specific types of interdependencies or interactions between the concepts. The social networking system 250 may use this stored information to provide various services (e.g., wall posts, photo sharing, event organization, messaging, games, advertisements, or the like) to its users to facilitate social interaction between users using the social networking system 250. In one embodiment, if users of the social networking system 250 are represented as nodes in the social graph, the term "friend" or "connection" may refer to an edge formed between and directly connecting two user nodes.

The social networking system 250 may facilitate linkages between a variety of concepts, including users, groups, etc. These concepts may be represented by nodes of the social graph interconnected by one or more edges. A node in the social graph may represent a concept that may act on another node representing another concept and/or that may be acted on by the concept corresponding to the other node. A social graph may include various types of nodes corresponding to users, non-person concepts, content items, web pages, groups, activities, messages, and other things that may be represented by objects in the social networking system 250.

An edge between two nodes in the social graph may represent a particular kind of connection, or association, between the two nodes, which may result from node relationships or from an action that was performed by a concept represented by one of the nodes on a concept represented by the other node. In some cases, the edges between nodes may be weighted. In certain embodiments, the weight associated with an edge may represent an attribute associated with the edge, such as a strength of the connection or association between nodes. Different types of edges may be provided with different weights. For example, an edge created when one user "likes" another user may be given one weight, while an edge created when a user befriends another user may be given a different weight.

C. Relationship Categories

A user may further categorize their connections and/or other users of the social networking system 250 according to various relationship categories. A relationship category may describe some relationship between the user and the users belonging to the user's relationship categories. One or more relationship categories may be automatically generated by the social networking system 250 for a user based on data associated with the user. In addition, a user may also create one or more relationship categories which may help the user organize his or her connections. The user may further customize his or her relationship categories, such as by modifying the name of a relationship category, a description of the relationship category, the users who should belong to the relationship, and the level of access to the user's shared content given to users belonging to the relationship category.

Relationship categories may be defined based on shared interests, shared social circles, or social proximity, or any other way of categorizing people. For example, a user who likes basketball, skiing, and opera may create categories for these three interests and classify their connections into these categories based on whether the user's connections also enjoy basketball, skiing, or opera. Similarly, a user may create categories according to his or her social circles, including a category for users who work at his or her company, a category for users who went to the user's undergraduate university, and a category for users who belong to the same chess club that the user belongs to. Furthermore, a user may create categories according to the social proximity, including categories for the user's acquaintances, friends, colleagues, coworkers, close friends, romantic interests, and family members. In one embodiment, users may be manually classified into relationship categories based on user input. In alternative embodiments, the social networking system 250 may automatically classify users into relationship categories using social networking data about the users.

A user's relationship categories may be configured to be viewable only by the user. The user may also configure his or her personal settings to share his or her relationship categories with other users. For example, a user may want to make the relationship category of his or her chess club members publically accessible so that other users may be able to access the same relationship category and see which users belong to the relationship category. The user may further adjust the permissions associated with the relationship category such that other users may add or remove users from the relationship category. In this way, the user along with other users may collaborate on including all chess club members into the relationship category created by the user, thereby helping all users who belong to the same chess club to more easily connect with each other on the social networking system 250.

2. Identity Storage

The social networking system 250 may further comprise an identity storage 270 for storing user profile data and/or social graph data as previously described. In one embodiment, the identity storage 270 may be a component of the social networking system 250, and may be stored within a memory device within the social networking system 250. In alternative embodiments, the identity storage 270 may also be a component external to the social networking system 250, such as being stored in an external memory device. The identity storage 270 may also be stored within a separate computer server than the computer server that provides the social networking system 250. The identity storage 270 may further be implemented as a global registry that may provide user profile data to one or more social networking systems 250.

A. User Accounts

The identity storage 270 may comprise one or more user accounts, such as user accounts 272a and 272b, for storing user profile data, such as biographical information about users, any other information that may describe a user's identity, or any other information relating to a profile of a user that may be displayed to other people. Each user account may comprise data about one user of the social networking system 250. In addition, each user of the social networking system 250 may comprise one or more user accounts. Each user account may comprise one or more perception profiles. For example, user account 272a may comprise perception profiles 274a to 274c and user account 272b may comprise perception profiles 274d to 274f. User account 272a may belong to the subject 112 while user account 272b may belong to the user 110 viewing the subject 112 using the AR device 122.

B. Perception Profiles

Each perception profile may comprise a selection of one or more augmented reality (AR) elements. For example, the perception profile 274a for a subject 112 may comprise a visual overlay of a t-shirt, a baseball cap, and a link to the subject's 112 user profile on a social networking system, while the perception profile 274b for the subject 112 may comprise a tie, a suit, and a link to the subject's user profile on a second social networking system. Each perception profile may further comprise an arrangement of the one or more AR elements comprised within the perception profile. For example, perception profile 274a may comprise an arrangement wherein the t-shirt is overlaid onto the subject's 112 body, wherein the baseball cap may be overlaid onto the subject's head, and a social networking profile link that may be positioned next to a view of the subject's body. Similarly, perception profile 274b may comprise an arrangement of the AR elements wherein the suit is overlaid onto the subject's 112 body, wherein the tie is overlaid around the subject's 112 neck, and the professional networking link may be positioned next to a view of the subject's 112 body when viewed using an AR device 122.

C. User Customization of Perception Profiles

The selection and the arrangement of the AR elements as specified by an perception profile may be customized by the user of the social networking system 250 that the profile belongs to. For example, with respect to perception profile 274a, a user may be able to rotate and adjust the orientation of the baseball cap, adjust the size and fit of the t-shirt, and the positioning of the social networking profile link. Similarly, with respect to perception profile 274b, a user of the social networking system 250 may be able to choose the color and shape of the tie, the fit and design of the suit, and the positioning of the user's professional networking profile link next to a view of the user's body. The user may further elect to display the link as a line of text displaying the web address that the link would connect to, or to display the link as a visual icon.

D. Assigning Profiles to Relationship Categories

Each perception profile may correspond to a relationship category of the user that the perception profile belongs to. For example, perception profile 274a, belonging to the subject 112 who is a user of the social networking system 250, may correspond to the subject's 112 relationship category for the subject's 112 connections who are categorized as the subject's friends. On the other hand, perception profile 274b may correspond to the subject's 112 relationship category for the subject's 112 co-workers. Accordingly, when the subject's 112 friends view the subject 112 using an AR device 122, the subject 112 may appear to be wearing a baseball cap and a t-shirt to the viewer. In addition, a link to the subject's social networking profile may also be displayed to the viewer such that the viewer may select the link using an interface on the viewer's client device 120 in order to display the webpage on the client device 120. Similarly, when the subject's 112 co-workers view the subject 112 using an AR device 122, the subject may appear to be wearing a suit and a tie. A link to the subject's second social networking profile may also be displayed and may be selected by the viewer such that a webpage may be displayed on the viewer's client device 120 in response to the viewer's selection.

As a result of this approach, different users of AR devices 122 may have a different view of the subject 112 when viewing the subject 112 through their AR devices 122 depending on their relationship with the subject. This gives the subject 112 and other users of the social networking system 250 more control over how they are perceived by their friends, co-workers and other connections having other relationships with the subject. For example, by appearing to be dressed in professional attire when viewed by a user's 110 co-workers, but casual attire when viewed by the user's 110 friends, the user 110 is able to manage the social distance between the user and their friends and co-workers, such as by maintaining a professional image in front of the user's co-workers, but a more casual image in front of the user's friends.

E. Global Registry

As previously described the identity storage 270 may be implemented as a global registry of user accounts that may be accessed by one or more social networking systems 250. Accordingly, the identity storage 270 may be implemented on a separate computer system or server system as the server system 150 that is implementing the social networking system 250 and is communicatively connected to the social networking system 250 and other social networking systems via the communications network 240. Alternatively, the identity storage 270 may also share the same server system 150 with the social networking system 250 and is therefore communicatively connected to the social networking system 250 via one or more communication channels internal to the server system 150. Nevertheless, the identity storage 270 may also be accessible by other social networking systems 250 via the communications network 240. The identity storage 270 may further be implemented on a distributed and decentralized network such as a blockchain network.

By implementing the identity storage 270 as a global registry that is accessible across multiple social networking systems 250, the user's control over their identity and how they are perceived by other people using AR devices 122 may be extended across those multiple social networking systems 250. For example, a subject 112 may use the same set of perception profiles that are stored within the identity storage 270 for displaying to viewers regardless of which social networking system 250 is being used to connect the subject 112 to the viewers. Consequently, the subject 112 only needs to customize and configure one set of perception profiles and does not need to assemble a separate set of profiles for each social networking system 250 that the subject 112 may be a user of.

Traditionally, users of social networking systems 250 may have limited control over how they are perceived and must resort to selecting between different social networking systems 250 in order to manage their identity. For example, to present a view to the user's coworkers, the user may create a profile on a social networking system and show that profile to the user's coworkers. And the user may create a profile on a separate social networking system that is geared towards the user's friends. Using the present approach, however, a user possessing a set of perception profiles that are stored on the identity storage 270 may no longer need to rely on the use of different profiles on different social networking systems 250, and may use the same set of perception profiles that determine what image the user would like to present to his or her viewers, including being able to present one view to the user's professional contacts and a different view to the user's personal contacts when the user is being viewed using an AR device 122.

Similarly, a user of one or more social networking systems 250 may traditionally have to manage privacy settings and viewing privileges on each one of the user's social networking systems 250 for different categories of people who may view the users' profiles. In contrast, this approach provides a user with one place for managing all of the user's perception profiles and the viewing permissions and privileges associated with each perception profile. This approach therefore helps the user avoid having to configure a separate set of profiles and viewing privileges for each one of one or more social networking systems 250 that the user may be a member of 3. Augmented Reality Marketplace The social networking system 250 may further comprise an augmented reality (AR) marketplace 260 for users of the social networking system 250 to buy, sell, and exchange AR elements that may be incorporated into the users' perception profiles. In one embodiment, the AR marketplace 260 may be implemented as a component of the social networking system 250, although it is understood that that the AR marketplace 260 may also be separate from the social networking system 250 in alternative embodiments, such as by being implemented on a separate server system 150 from that of the social networking system 250. The AR marketplace 260 may comprise data that is stored on a memory storage of the social networking system 250 and may comprise instructions for providing the functions of the AR marketplace 260 that may be executed on the same server system 150 upon which the social networking system 250 may be implemented. Users of the social networking system 250 may use and interact with the AR marketplace 260 using client devices 120, such as by interacting with a graphical user interface provided by the client devices 120.

As previously discussed, each perception profile may comprise a selection of one or more AR elements. A user of the social networking system 250 may select the one or more AR elements from a plurality of AR elements that are available to the user for configuring the user's perception profiles. The user may create these AR elements. For example, one AR element may be a three-dimensional graphical overlay that may be displayed over a view of the user when another user views the user using an AR device 122. This AR element may be designed by the user using a graphical editing application. The social networking system 250 and/or the identity storage 270 may further provide a collection of pre-constructed default AR elements that may be used by the user to configure their perception profiles even when the user has not created any AR elements on their own. The user may also obtain AR elements that are made by other users.

The AR marketplace 260 may provide a platform for the user to trade AR elements with other users. Once an AR element is created by a user of the social networking system 250 and/or the identity storage 270, the user may upload the AR element to the AR marketplace so that it may be shared with other users. Once the AR element is uploaded to the AR marketplace 260, users of the social networking system 250 may then select the AR element, incorporate it into their perception profiles, and further modify and configure the AR element. Some of the AR elements may be immediately accessible once they are uploaded to the AR marketplace 260 while others may require payment of a fee. The AR marketplace 260 may facilitate these payments and make various AR elements available to users who have completed payment. Users who create and upload AR elements to the AR marketplace 260 may set how much to charge for these AR elements. A percentage of the payment made for each transaction for purchasing an AR element may be retained by the social networking system 250 and the remaining amount of the payment may be retained by the creator of the AR element. In addition to user-created AR elements, the social networking system 250 may also provide AR elements that may be made available to users upon successful purchase. It is understood that other payment and sharing arrangements for AR elements may also be utilized in alternative embodiments.

III. Configuring Perception Profiles

Figure 3:
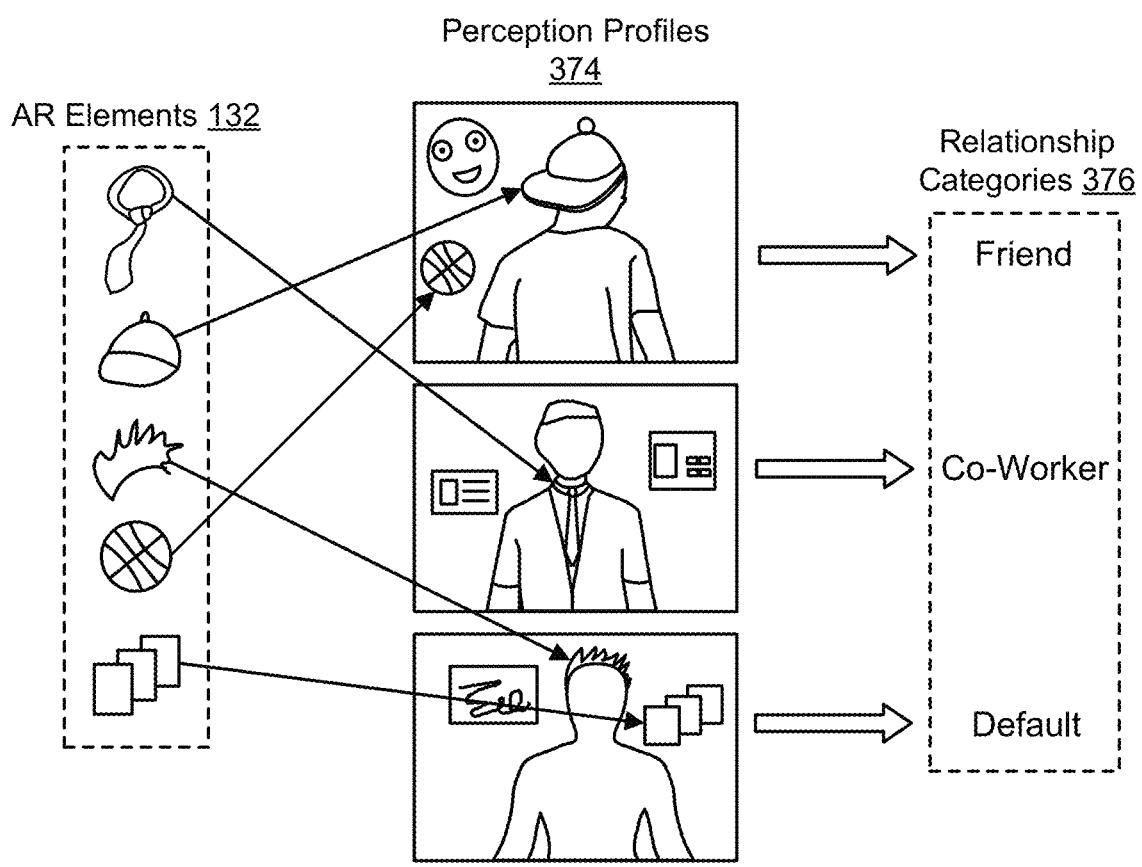
FIG. 3 is a block diagram illustrating how perception profiles may be customized by a user of a social networking system according to embodiments of the present technology.

FIG. 3 illustrates a block diagram for how a user of the social networking system 250 may configure one or more perception profiles (e.g., perception profiles 374). A user may select one or more AR elements 132 to display and overlay onto a view of the user. As previously discussed, these AR elements 132 may include articles of clothing and accessories that may be incorporated into the user's attire as perceived by other people using AR devices 122. AR elements 132 may also include enhancements to the user's face and body, such as an augmentation that changes the user's hair color, enlarges the user's eyes, enhances the user's facial expressions, makes the user's body appear to be more muscular or fit, or changes the user's skin tone. AR elements 132 may further include various graphical artifacts such as icons that display a user's mood, hobbies, or affiliation, as well as data about the user, such as biographical information, or links to the user's website or profiles on other social networking systems 250. Other AR elements 132 may also be included in further embodiments.

The social networking system 250 may provide a set of AR elements 132 that may be used by the user to customize their perception profiles 374. In addition the user may further create their own AR elements 132 or borrow AR elements 132 from other users. The user may further purchase additional AR elements 132 from the AR marketplace 260 as previously discussed.

These AR elements 132 may be arranged by the user over the view of the user to form perception profiles 374, which specify which AR elements to display and how these AR elements are to be arranged over a view of the user when the user is viewed by another person using an augmented reality device 122. A user may create and configure one or more perception profiles 374. The user may further assign each of the one or more perception profiles 374 to a relationship category 376.

A user may define one or more relationship categories 376 and customize which of the user's connections belong to each of the user's one or more relationship categories 376. Each of the user's connections may belong to one or more relationship categories. For example, the user may have a relationship category for all of the user's friends and another relationship category for all of the user's coworkers. The user may further have a default relationship category for all connections that have not been or have not yet been categorized. Other ways of categorizing people may also be used in alternatively embodiments as previously discussed.

In one embodiment, the user may assign a first perception profile 374 to a first relationship category 376 for the user's friends, a second perception profile 374 to a second relationship category 376 for the user's coworkers, and a third perception profile 374 to the user's default relationship category 376. The first perception profile 374 may comprise casual clothing overlays such as a baseball cap and a t-shirt, icons representing the user's hobbies and mood, and a link to the user's social networking profile page. The second perception profile 374 may comprise formal attire such as a suit and tie, information about the user's job history and a link to the user's second social networking profile page. The third perception profile 374 may comprise augmentations to enhance the look of the user's hair, and some general biographical information about the user. As a result of this arrangement, different people would see different views of the user when viewed via an augmented reality device 122 depending on the viewer's relationship with the user. These views would be constructed according to the specifications of the user's various perception profiles 374.

Figure 4:
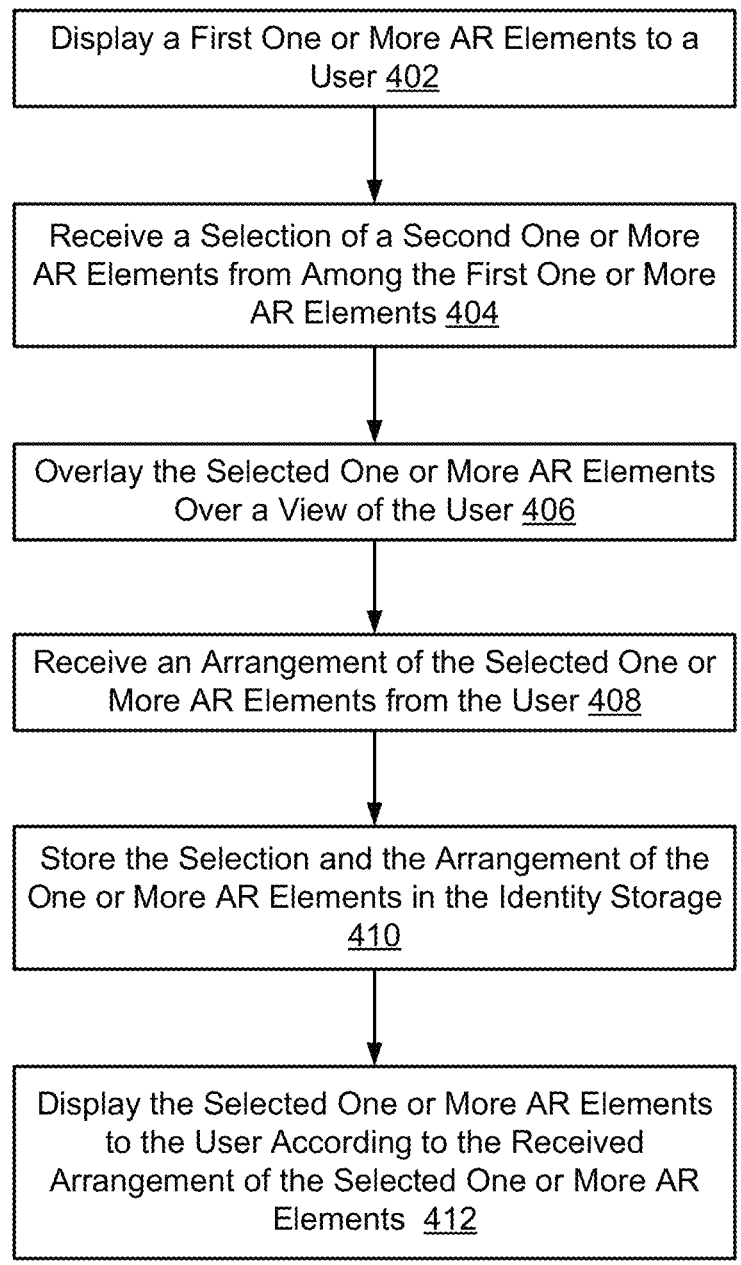
FIG. 4 is a flow diagram illustrating an exemplary method for configuring a perception profile according to embodiments of the present technology.

FIG. 4 illustrates a flowchart for providing a user with a way to configure their perception profile 374. At step 402, one or more augmented reality elements 132 may be displayed to a user of the social networking system 250. These augmented reality elements 132 may comprise augmented reality elements 132 that are available to the user for use in configuring the perception profiles 374 as well as augmented reality elements 132 that are not yet accessible to the user and may require payment or fulfilling other requirements before the augmented reality elements 132 may become available for use by the user. The augmented reality elements 132 may be sent from the server system 150 to a client device 120 and displayed to the user at the client device 120. For example, the client device may be an augmented reality device 122, such that the augmented reality elements 132 may be displayed on the display 126 of the augmented reality device 122. The augmented reality elements 132 may be displayed as a series of icons in a scrollable list of such icons. Other methods of presenting the augmented reality elements 132 to the user may also be employed in alternative embodiments.

At step 404, the social networking system 250 may receive a selection of one or more augmented reality elements 132 from the user via the client device 122 and the communications network 240. The user may select one or more augmented reality elements 132 from among those that are displayed to the user. For example, the user may interact with a touch screen display 126 on an augmented reality device 122 and tap on the augmented reality elements 132 that the user would like to select. Alternatively, the display 126 may also display a view of the user, or alternatively, a view of a generic human model. The user may then drag and drop the augmented reality elements 132 from among the list of available augmented reality elements 132 onto the view of the user. The user's selection may then be transmitted to the social networking system 250 over the communications network 240.

At step 406, upon receiving the user's selection at the social networking system 250, the social networking system 250 may instruct the client device to overlay the selected augmented reality elements 132 onto the view of the user and display that to the user.

At step 408, the user may then manipulate how the augmented reality elements 132 are arranged over the view of the user. For example, the user may adjust the size, orientation, and various other visual features of the augmented reality elements 132, such as by using the touch interface on the display 126 of the augmented reality device 122.

At step 410, the user's specified arrangement of the augmented reality elements 132 may be sent to the social networking system 250 via the communications network 240. The social networking system 250 may then update the appropriate perception profile 374 in the identity storage 270 with respect to how the augmented reality elements 132 are arranged as specified by the perception profile 374.

At step 412, the social networking system 250 may further instruct the client device 120 to also update how the augmented reality elements 132 are displayed to the user. This way, the user gets immediate feedback on how the perception profile 374 may look based on the user's input.

It is understood that the steps recited above may be either performed by the server system 150 that is providing for the social networking system 250 or by the client device, or a combination of the two, or any other arrangement that's appropriate for carrying out the recited steps.

IV. Displaying AR Elements Based on Perception Profiles

Figure 5:
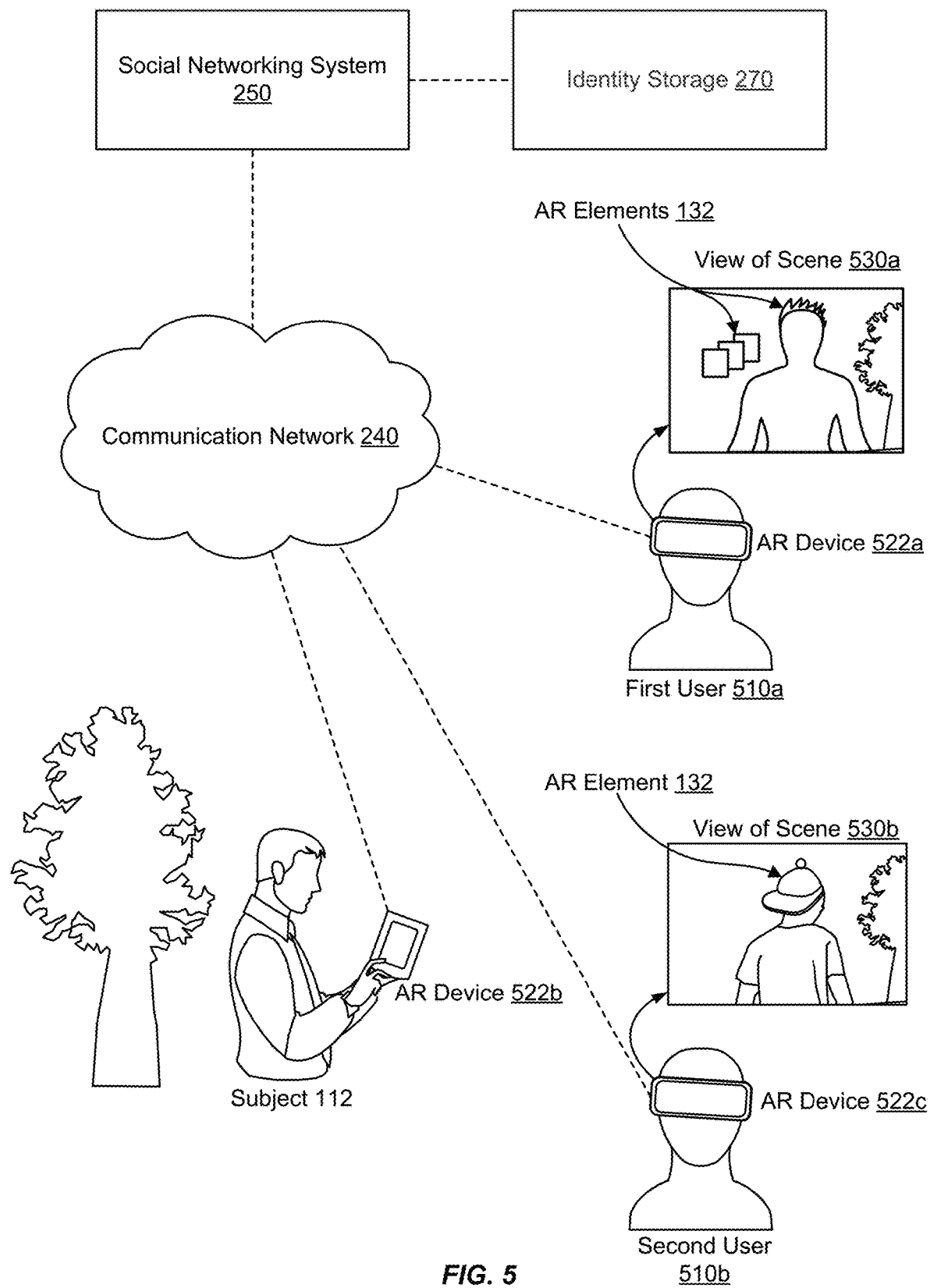
FIG. 5 is a block diagram illustrating how the augmented reality social networking system may be used to display a different view of a scene comprising a subject to different users of augmented reality devices according to embodiments of the present technology.

FIG. 5 illustrates another block diagram of the augmented reality social networking system 250 illustrated in FIG. 2, further showing how different users of augmented reality devices 122 (corresponding to augmented reality devices 522a, 552b, and 522c in FIG. 5) may see different augmented reality elements 132 overlaid in different arrangements over a view of a subject 112. For example, a first user 510a may see a view of a scene 530a with the subject 112 corresponding to a default perception profile 374. This may be because the first user 510a is not a member of the same social networking system 250, the first user 510a is not one of the subject's 112 connections, or because the first user 510a is a connection, but has not been categorized by the subject 112 into another non-default relationship category, or for any other reason. Similarly, a second user 510b may see a view of a scene 530b with the subject 112 corresponding to a perception profile 374 for the subject's 112 friends. In this view, the second user 510b may see the subject 112 as being dressed in casual attire, such as a baseball cap, which would not be viewable by the first user.

Figure 6:
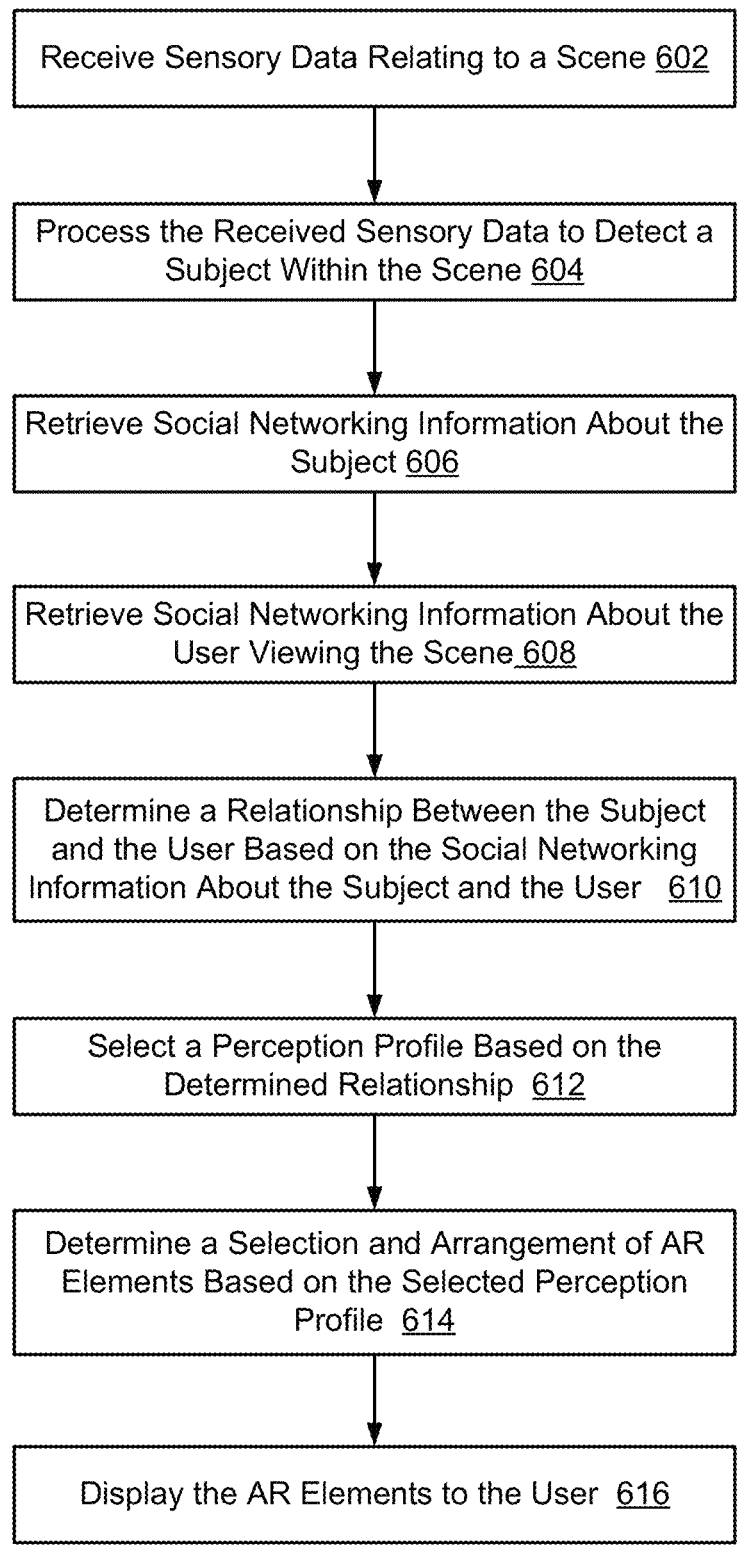
FIG. 6 is a flow diagram illustrating an exemplary method for displaying augmented reality elements based on a selected perception profile according to embodiments of the present technology.

FIG. 6 illustrates a flowchart for enhancing a view of a subject 112 with augmented reality elements 132 based on a perception profile 374 of the subject 112. At step 602, an augmented reality device 122 in the possession of a user 110 of the augmented reality device 122 may comprise a sensor that may scan a scene and collect sensory data relating to the scene. The sensor 124 may be a camera that is able to take in a series of imaging data at regular time intervals, such as taking in thirty images every second. The imaging data may comprise a two-dimensional array of pixels having four channels of imaging data, including three color channels for red, blue, and green, and another channel for intensity. Other ways of scanning a scene and representing the scene may also be used in alternative embodiments.

At step 604, the sensory data collected from the previous step may be sent from the sensor 124 to the processor of the augmented reality device 122. The processor may then process the sensory data, such as by organizing the data into a more compact or organized format. The processor may also analyze the sequence of imaging data to derive motion data relating to the movement of objects within the scene.

Based on the sensory data and the derived data, the augmented reality device 122 may detect a person, i.e. a subject, within the scene. This step may involve one or more operations, such as operations for detecting an object within the scene, determining that the object is a person, determining that the person is a user of the social networking system 250, determining the identity of the person and/or user, or any combination of these operations. Each of these operations may be performed by one or more augmented reality devices 122, the social networking system 250 or any other systems or devices according to various embodiments of the present technology. For example, one embodiment may involve collecting the sensory data at the augmented reality device 122 and sending all of that data to the social networking system 250 for further processing. In alternative embodiments, the augmented reality device 122 may perform the operations of collecting and analyzing the sensory data to determine that a viewed object in a scene is a person and then sending a request to the social networking system 250 to determine whether the person is a user of the social networking system 250 and to retrieve additional data about the user from the social networking system 250.

In one embodiment, the social networking system 250 may use the sensory and derived data to determine whether a person is present within the scene and identify whether the person within the scene matches a person registered with the social networking system 250. For example, the processed sensory data and any derived data may be provided to a neural network as inputs. The neural network may be trained to take in sensory data as input in order to provide a classification outcome that specifies whether a person is present in a scene and identify who the person may be. Given a set of input data, the neural net may determine whether the subject 112 is present within the scene, whether the subject 112 is a user of the social networking system 250, and if so, which user profile the subject 112 might correspond to. The identity of the subject 112 may be determined using facial recognition algorithms. Other methods of identifying people may also be used in alternative embodiments.

At step 606, the augmented reality device 122 may submit the results of detecting the subject 112 to the social networking system 250. The social networking system 250 may then use the information received from the augmented reality device 122 to retrieve social networking information about the subject 112. Social networking information may include biographical information about the subject 112, the subject's 112 prior activities on the social networking system 250, or any other information about the subject 112 as previously discussed. Alternatively, the social networking system 250 may only retrieve information on the subject's 112 relationship categories.

At step 608, the social networking system 250 may also retrieve social networking information about the user 110. This may include the same types of information that were retrieved for the subject at step 606. Alternatively, this information may comprise a small set of data, such as who the user is connected to and information about the user's relationship categories.

At step 610, the social networking system 250 may determine a relationship between the subject 112 and the user 110 based on the social networking data retrieved for the subject 112 and the user 110. In one embodiment, the social networking system 250 may identify whether the user 110 belongs to one of the subjects' 112 relationship categories, such as friends or coworkers. If the user 110 does not belong to any of the subjects' 112 relationship categories, the social networking system 250 may identify that a default category is appropriate for the user. In alternative embodiments, machine learning may be applied to the social networking data retrieved for the subject 112 and the user to predict which category the user should belong to. Such a prediction may be based on the user and the subject's social networking data. A neural network may be used for such prediction tasks and may be trained using data regarding the subject's 112 existing classifications of the subject's 112 existing contacts into relationship categories, which may be defined by the subject 112. This allows the user 110 to be automatically categorized into one of the subject's 112 relationship categories without requiring explicit input from the subject. The subject 112 may be able to configure whether such automatic classification features should be active. Other approaches to determining a relationship between the subject 112 and the user 110 may also be used in alternative embodiments.

At step 612, a perception profile 374 may be selected for display based on the determined relationship between the subject 112 and the user 110. For example, upon classifying the user 110 as being part of the subject's 112 friend category, the perception profile 374 corresponding to that relationship category may be selected for subsequent display to the user 110.

At step 614, based on the selected perception profile 374, the selection and arrangement of various augmented reality elements 132 may be extracted from the specification of the perception profile 374. This data may then be sent to the augmented reality device 122. In one embodiment, the augmented reality device 122 comprises a collection of augmented reality elements 132 that may be displayed depending on the specification received from the social networking system 250 regarding the selection and arrangement of the augmented reality elements 132. Alternatively, the augmented reality device 122 may need to retrieve data about augmented reality elements 132 from the social networking system 250 and/or the identity storage 270 via the communications network 240.

At step 616, the selection and arrangement of AR elements may be displayed to the user 110 on the display 126 of the augmented reality device 122 in the user's 110 possession. For example, upon classifying the user 110 as being the subject's 112 coworker, a perception profile 374 corresponding to the coworker relationship category may be selected. The perception profile 374 may be sent to the augmented reality device 122 from the social networking system 250 to inform the augmented reality device 122 on which augmented reality elements 132 to display and in what arrangement the augmented reality devices 122 may be displayed to the user 110.

Each of the steps recited herein as well as components of the steps may be performed by the augmented reality device 122, the social networking system 250, a combination of the two, or in combination with devices and components outside of the social networking system 250 and augmented reality device 122.

V. Transitioning from a First Perception Profile to a Second Perception Profile

Figure 7:
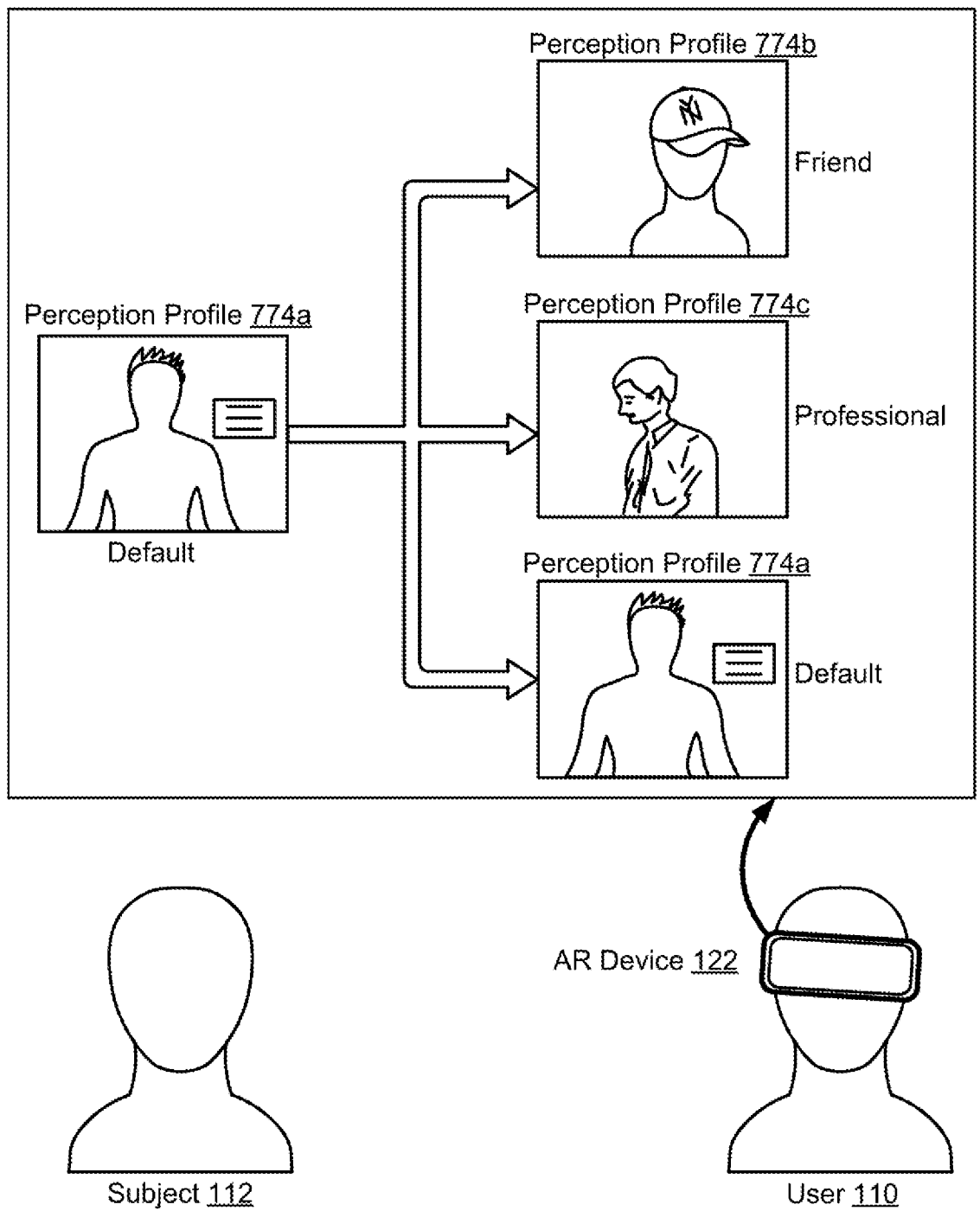
FIG. 7 is a block diagram illustrating how a user's view of a subject may transition during an interaction according to embodiments of the present technology.

FIG. 7 illustrates a block diagram showing how a user 110 of an augmented reality device 122 may be classified as belonging to a first relationship category as defined by the subject 112 at the beginning of an interaction with the subject 112, and become reclassified as belonging to a second relationship category as defined by the subject 112. Upon reclassifying the user 110 as belonging to a new relationship category, a new perception profile 374 (corresponding to perception profile 774b or perception profile 774c in FIG. 7) may be selected to replace the old perception profile 374 (a default perception profile 774a in FIG. 7) corresponding to the first relationship category. As a result, the user's 110 view of the subject 112 may change during the course of an interaction with the subject 112.

Reclassifying the user 110 may be based on sensory data gathered by the augmented reality device 122 during the course of the user's 110 interaction with the subject 112. For example, the augmented reality device 122 may analyze the sensory data about the subject 112 to identify that the subject's 112 demeanor towards the user 110 has become more friendly. Using facial recognition and other machine learning techniques, the augmented reality device 122 may detect that the subject is smiling more often or speaking in a more friendly tone. The augmented reality device 122 may also use natural language processing techniques to understand the contents of a conversation between the user 110 and the subject 112 and thus be able to recognize when the subject 112 has given verbal consent to connecting with the user 110 and reclassifying the user 110 into another relationship category.

Figure 8:
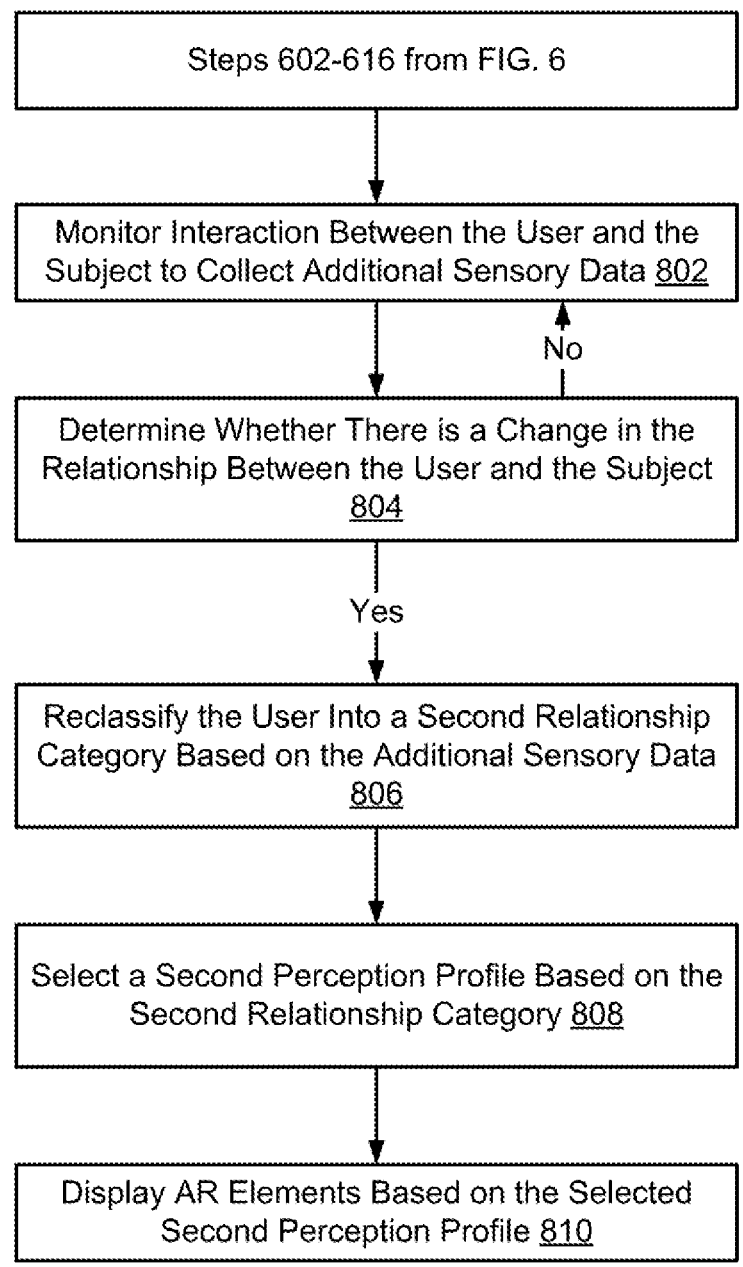
FIG. 8 is a flow diagram illustrating an exemplary method for reclassifying a user and displaying a different perception profile during an interaction according to embodiments of the present technology.

FIG. 8 illustrates a flow chart showing a method for transitioning from a first perception profile 374 to a second perception profile 374 during an interaction between the user 110 and the subject 112. The method illustrated in FIG. 8 continues from the steps recited with respect to FIG. 6.

At step 802, the augmented reality device 122 may monitor the interaction between the user 110 and the subject. For example, the user 110 and the subject 112 may be conducting a conversation and the augmented reality device 122 may collect sensory data about the subject's facial expression, body language, tone of speech, and content of speech. Other data produced during the course of the interaction may also be monitored in alternative embodiments.

At step 804, the augmented reality device 122 may process the collected sensory data and determine whether there has been a change in the relationship between the user 110 and the subject 112. In one embodiment, the user 110 may be a stranger to the subject 112 at the beginning of the interaction. Because the user 110 is not an existing connection with the subject on the social networking system 250, the user 110 may only be able to view the default perception profile 374 of the subject 112. During the conversation, however, the augmented reality device 122, working in conjunction with the social networking system 250, may detect that the pattern of behavior between the subject 112 and the user 110 resembles the subject's 112 behavior around people belonging to the subject's 112 other relationship categories. For example, if the subject 112 acts in a professional manner around the user, the augmented reality device 122 may reclassify the user 110 as being a professional contact rather than a stranger, and transition to a professional perception profile 374 rather than a default perception profile 374. Similarly, if the subject 112 acts in a casual friendly manner around the user 110, the user 110 may be reclassified as belonging to the subject's 112 friend category and thus gain access to the corresponding perception profile 374 for that category. If there has been no change to how the subject 112 and the user 110 interact, then the approach may return to step 802.

At step 806, when the augmented reality device 122 and the social networking system 250 have detected a change in the relationship between the user 110 and the subject 112, the system may reclassify the user 110 into a new relationship category based on the sensory data. For example, the subject 112 may have granted explicit verbal consent to connect with the user 110 as a friend on the social networking system 250.

At step 808, a second perception profile 374 may be selected based on the new relationship category that the user 110 has been classified into. The second perception profile 374 may be selected by the social networking system 250, which may then transfer the data contained within the second perception profile 374, including the selection and arrangement of augmented reality elements 132, to the user's 110 augmented reality device 122.

At step 810, the user's 110 augmented reality device 122 may display the augmented reality elements 132 specified by the perception profile 374 on the display 126 of the augmented reality device 122. In this way, the social networking system 250 is able to present a new appearance and display new information about the subject 112 to the user 110 automatically based on the nature of the interaction between the subject 112 and the user 110 and without requiring manual input from the subject 112.

Each of the steps recited herein as well as components of the steps may be performed by the augmented reality device 122, the social networking system 250, a combination of the two, or in combination with devices and components outside of the social networking system 250 and augmented reality device 122.

Figure 9:
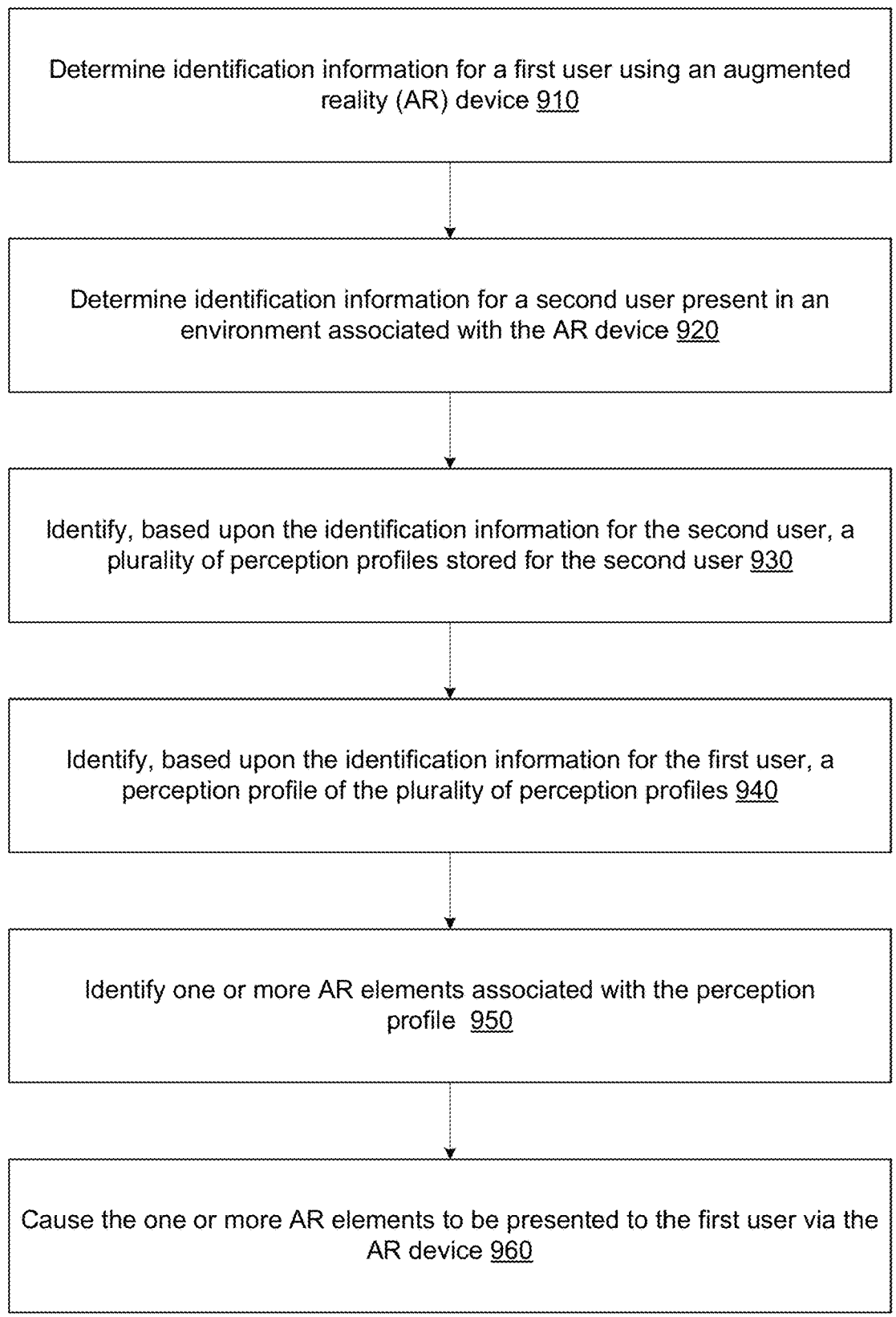
FIG. 9 depicts processing performed to cause an augmented reality element to be presented to a user via an augmented reality device according to certain embodiments described herein.

FIG. 9 depicts processing performed to cause an augmented reality element to be presented to a user via an augmented reality device according to certain embodiments described herein. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain embodiments, the steps may be performed in some different order or some steps may also be performed in parallel. In addition, each of the steps below may be performed on one or more systems, such as an augmented reality system (e.g., augmented reality device) or a remote system (e.g., a social networking system). In some examples, some steps may be performed by a first system while other steps are performed by a second system.

In the embodiment depicted in FIG. 9, the processing may be triggered at 910 when identification information is determined for a first user, where the first user is using an augmented reality (AR) device. Using the AR device may indicate that the first user is viewing and/or listening to an output of the AR device. The identification information may include a unique identification of the first user that may be used by a remote system to store data for the first user. For example, the identification information may include a social networking account managed by a social networking system. For another example, the identification information may include an email, a phone number, a IP address, or other information that may uniquely identify a user. While various ways to determine the identification information are described below, it should be recognized that the identification information may be determined in other ways.

In some examples, the identification information may be determined based upon a connection between the AR device and a remote system (e.g., a social networking system). For example, the connection may be associated with the identification information. For another example, data sent from the AR device to the remote system may be accompanied with the identification information.

In other examples, the first user may have logged into the AR device in order to use the AR device. The login process may provide the identification information when the first user logs into the AR device.

At 920, identification information may be determined for a second user, where the second user is present in an environment associated with the AR device. The identification information for the second user may be determined from content captured (e.g., one or more images or an audio segment) by the AR device. In particular, a content recognition process may be used to identify the second user in the content captured. In other examples, the second user may be associated with a device (such as another AR device) that is configured to transmit the identification information for the second user when needed.

At 930, a plurality of perception profiles stored for the second user may be identified, where each perception profile is defined by the second user for a different relationship with the second user. The plurality of perception profiles may be identified based upon the identification information for the second user. For example, a first perception profile may be associated with friends of the second user while a second perception profile may be associated with coworkers of the second user. In some examples, each perception provide may include a set of one or more AR elements that may be used to change the perception of a user, as further described below.

At 940, a perception profile of the plurality of perception profiles may be identified. The perception profile may be identified based upon the identification information for the first user. In some examples, the perception profile may be associated with a particular relationship with the second user. In such examples, identifying the perception profile may include determining that the first user has the particular relationship with the second user. Determining that the first user has the particular relationship with the second user may be based upon sensory data captured by the AR device and social networking data related to the first user and the second user. For example, the sensory data may be used to identify an account of a social networking system for the second user. Then, social networking data (e.g., a social graph) of the account may be used to determine that the first user is a friend of the second user. The plurality of perception profiles may be available across a plurality of social networking systems.

At 950, one or more AR elements associated with the perception profile may be identified, where the one or more AR elements are defined by the second user. For example, the perception profile may define that a male friend (or a particular male friend) is made to look like they are wearing a particular hat.

In some examples, an AR element of the one or more AR elements enhances an emotive expression of the second user. For example, the AR element may add a storm cloud above the second user. For another example, the AR element may mask a facial expression of the second user.

At 960, the one or more AR elements may be caused to be presented to the first user via the AR device. An AR element of the one or more AR elements may be a visual element. The visual element may be displayed over a view of the environment by the AR device. In some examples, the perception profile may include an arrangement of the visual element. In such examples, the visual element may be displayed based upon the arrangement having been customized by the second user. An AR element of the one or more AR elements may also be an auditory or haptic element. The auditory element may be played to the first user by the AR device. The haptic element may cause a force to be applied to the first user to simulate a touch.

In some examples, the processing performed in FIG. 9 may further include identifying a second perception profile of the plurality of perception profiles. In such examples, the second perception profile may be identified based upon updated identification information for the first user. In some examples, the second perception profile may be associated with a second relationship with the second user. In such examples, identifying the second perception profile may include determining that the first user has changed to have the second relationship with the second user rather than the particular relationship. The processing performed in FIG. 9 may further include identifying one or more second AR elements associated with the second perception profile and causing the one or more second AR elements to be presented to the first user via the AR device.

In some examples, the processing performed in FIG. 9 may further include determining identification information for a third user, where the third user is also present in the environment associated with the AR device. In such examples, the steps described above for the second user may be performed for the third user, where a different perception profile is identified for the third user than the second user. And because there is a different perception profile identified for the third user, the third user may look different to the first user as compared to the second user.

In some examples, the processing performed in FIG. 9 may further include determining identification information for a fourth user, where the fourth user is using a second AR device. The fourth user may be in the same environment as the first user. Accordingly, the steps above related to the second user may also be performed for the fourth user. However, because the fourth user is different than the first user, the relationship between the fourth user and the second user may be different than the relationship between the first user and the second user, causing a different perception profile to be identified. And because there is a different perception profile identified for the second user relative to the fourth user, the second user may be perceived different to the fourth user as compared to when the first user is perceiving the second user. For example, the first user and the second user may be friends while the fourth user and the fourth user are coworkers. When the first user views the second user, a perception profile defined by the second user may cause the second user to appear in casual clothes to the first user. At the same time, when the fourth user views the second user, a different perception profile defined by the second user may cause the second user to appear in a suit to the fourth user. In such an example, the choice of the particular clothes related to casual clothes and the suit may be chosen by the second user when the second user defined the perception profiles.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

Figure 10:
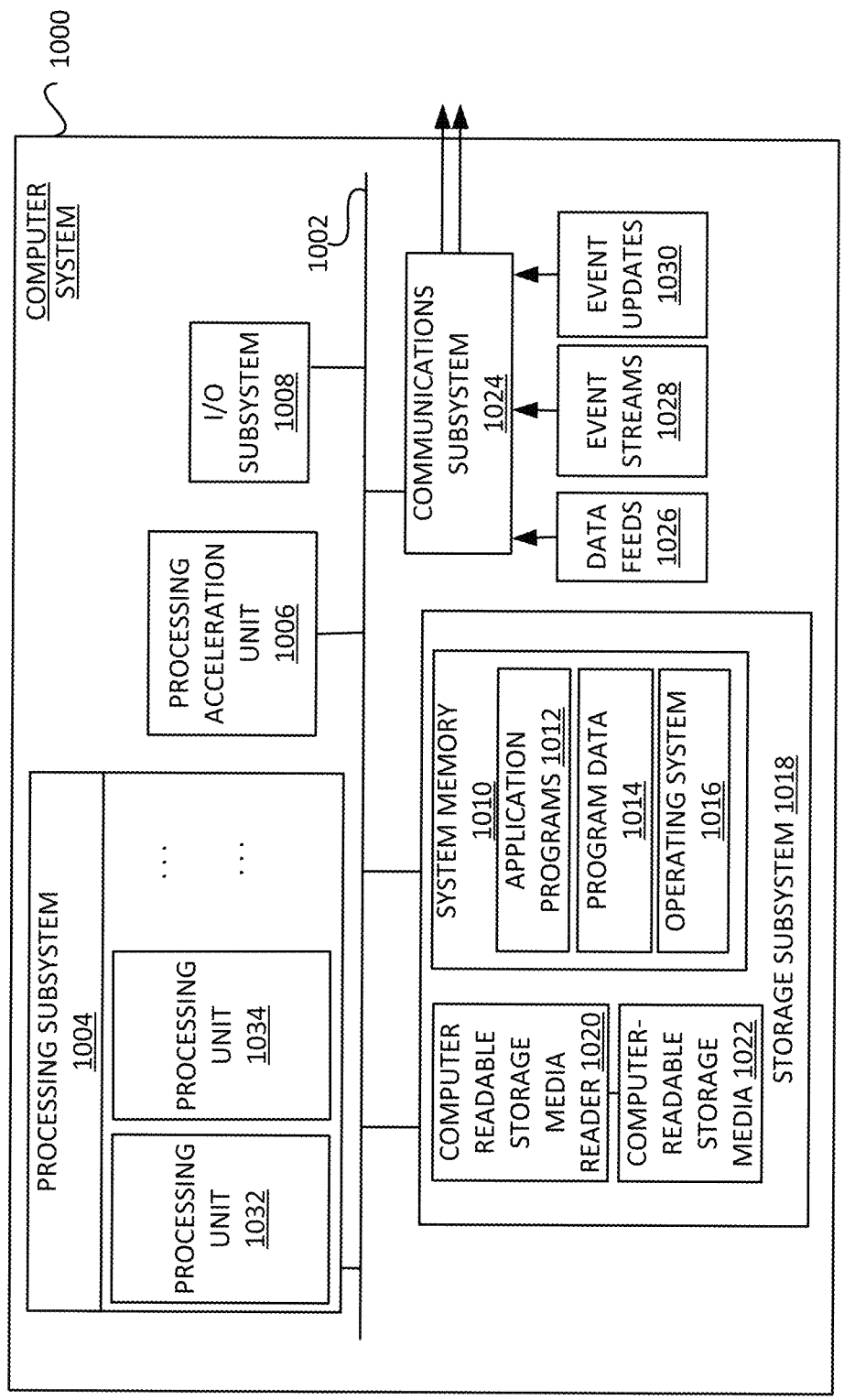
FIG. 10 illustrates an example of a computer system which may be used to implement certain embodiments described herein.

FIG. 10 illustrates an example of a computer system 1000, which may be used to implement certain embodiments described herein. For example, in some embodiments, computer system 1000 may be used to implement any of the systems, servers, devices, or the like described above. As shown in FIG. 10, computer system 1000 includes processing subsystem 1004, which communicates with a number of other subsystems via bus subsystem 1002. These other subsystems may include processing acceleration unit 1006, I/O subsystem 1008, storage subsystem 1018, and communications subsystem 1024. Storage subsystem 1018 may include non-transitory computer-readable storage media including storage media 1022 and system memory 1010.

Bus subsystem 1002 provides a mechanism for allowing the various components and subsystems of computer system 1000 to communicate with each other. Although bus subsystem 1002 is shown schematically as a single bus, alternative embodiments of bus subsystem 1002 may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include single core and/or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some embodiments, processing subsystem 1004 may include one or more special purpose co-processors such as graphics processors, digital signal processors (DSPs), or the like. In some embodiments, some or all of the processing units of processing subsystem 1004 may be implemented using customized circuits, such as application specific integrated circuits (ASICs), or field programmable gate arrays (FPGAs).

In some embodiments, the processing units in processing subsystem 1004 may execute instructions stored in system memory 1010 or on computer readable storage media 1022. In various embodiments, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain embodiments, processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that, when executed by processing subsystem 1004, provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes system memory 1010 and computer-readable storage media 1022. System memory 1010 may include a number of memories, including (1) a volatile main random access memory (RAM) for storage of instructions and data during program execution and (2) a non-volatile read only memory (ROM) or flash memory in which fixed instructions are stored. In some implementations, a basic input/output system (BIOS), including the basic routines that help to transfer information between elements within computer system 1000, such as during start-up, may typically be stored in the ROM. The RAM typically includes data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and operating system 1016.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include computer-readable storage media reader 1020 that may further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1024 may provide wired network connectivity (e.g., Ethernet) in addition to or instead of a wireless interface.

Communication subsystem 1024 may receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as web feeds and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device, a wearable device, a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

The invention claimed is:

1. An augmented reality (AR) device used by a first user, the AR device comprising:
   a sensor configured to capture sensory data related to an environment;
   a processor configured to:
      detect a second user within the environment based upon the sensory data;
      retrieve a first perception profile for the second user from a memory, wherein the memory includes a plurality of perception profiles for the second user, the plurality of perception profiles including the first perception profile and a second perception profile, and wherein the first perception profile is retrieved based upon identification information for the first user and in response to the first user being determined to have a first relationship with the second user;
      identify one or more AR elements associated with the first perception profile, wherein the one or more AR elements are defined by the second user;
      retrieve the second perception profile from the memory in response to determining that the first user has changed from the first relationship to a second relationship with the second user, the change from the first relationship to the second relationship being determined based upon updated sensory data captured by the sensor after the second user has been detected or based upon updated identification information for the first user; and
      identify one or more second AR elements associated with the second perception profile; and
   an audio or video output device configured to present the identified one or more AR elements and the identified one or more second AR elements.

2. The AR device of claim 1, wherein the sensor is configured to capture the sensory data and the updated sensory data during an interaction between the first user and the second user.

3. A method comprising:
   determining identification information for a first user, the first user using an augmented reality (AR) device;
   determining identification information for a second user, the second user present in an environment associated with the AR device;
   identifying, based upon the identification information for the second user, a plurality of perception profiles stored for the second user, wherein each perception profile is defined by the second user for a different relationship with the second user;
   identifying, based upon the identification information for the first user, a first perception profile of the plurality of perception profiles, wherein identifying the first perception profile includes determining that the first user has a first relationship with the second user;
   identifying one or more AR elements associated with the first perception profile, wherein the one or more AR elements are defined by the second user;
   causing the one or more AR elements to be presented to the first user via the AR device;
   determining, based upon sensory data captured by the AR device after determining the identification information for the second user or based upon updated identification information for the first user, that the first user has changed from the first relationship to a second relationship with the second user;
   identifying a second perception profile of the plurality of perception profiles, wherein the second perception profile is defined for the second relationship;
   identifying one or more second AR elements associated with the second perception profile; and
   causing the one or more second AR elements to be presented to the first user via the AR device.

4. The method of claim 3, wherein an AR element of the one or more AR elements is a visual element, and wherein the visual element is displayed over a view of the environment by the AR device.

5. The method of claim 4, wherein the first perception profile includes an arrangement of the visual element, and wherein the visual element is displayed based upon the arrangement having been customized by the second user.

6. The method of claim 3, wherein determining that the first user has the first relationship with the second user is based upon sensory data captured by the AR device prior to determining the identification information for the second user and further based upon social networking data related to the first user and the second user.

7. The method of claim 3, wherein determining that the first user has changed from the first relationship to the second relationship is based upon the updated identification information for the first user.

8. The method of claim 7, wherein the updated identification information for the first user comprises an email address, a phone number, or an IP address.

9. The method of claim 3, wherein the plurality of perception profiles are available across a plurality of social networking systems.

10. The method of claim 3, wherein an AR element of the one or more AR elements enhances an emotive expression of the second user.

11. The method of claim 3, wherein determining that the first user has changed from the first relationship to the second relationship comprises:
    detecting the change from the first relationship to the second relationship by analyzing at least one of following features indicated by the sensory data: a facial expression of the second user, a body language of the second user, a tone of speech of the second user, or a content of the second user's speech.

12. The method of claim 3, wherein the change from the first relationship to the second relationship is determined based upon the sensory data, and wherein the sensory data is captured during an interaction between the first user and the second user.

13. The method of claim 12, wherein determining that the first user has changed from the first relationship to the second relationship comprises:
    detecting, based upon the sensory data, a pattern of behavior between the first user and the second user over a course of the interaction.

14. A system comprising:
    a processor; and
    a non-transitory computer-readable storage medium storing instructions that, when executed by the processor, cause the system to:
    determine identification information for a first user, the first user using an augmented reality (AR) device;
    determine identification information for a second user, the second user present in an environment associated with the AR device;
    identify, based upon the identification information for the second user, a plurality of perception profiles stored for the second user, wherein each perception profile is defined by the second user for a different relationship with the second user;
    identify, based upon the identification information for the first user, a first perception profile of the plurality of perception profiles, wherein identifying the first perception profile includes determining that the first user has a first relationship with the second user;
    identify one or more AR elements associated with the first perception profile, wherein the one or more AR elements are defined by the second user;
    cause the one or more AR elements to be presented to the first user via the AR device;
    determine, based upon sensory data captured by the AR device after the system has determined the identification information for the second user or based upon updated identification information for the first user, that the first user has changed from the first relationship to a second relationship with the second user;
    identify a second perception profile of the plurality of perception profiles, wherein the second perception profile is defined for the second relationship;
    identify one or more second AR elements associated with the second perception profile; and
    cause the one or more second AR elements to be presented to the first user via the AR device.

15. The system of claim 14, wherein an AR element of the one or more AR elements is a visual element, and wherein the visual element is displayed over a view of the environment by the AR device.

16. The system of claim 15, wherein the first perception profile includes an arrangement of the visual element, and wherein the visual element is displayed based upon the arrangement having been customized by the second user.

17. The system of claim 14, wherein determining that the first user has the first relationship with the second user is based upon sensory data captured by the AR device prior to the system determining the identification information for the second user and further based upon social networking data related to the first user and the second user.

18. The system of claim 14, wherein determining that the first user has changed from the first relationship to the second relationship is based upon the updated identification information for the first user.

19. The system of claim 14, wherein the plurality of perception profiles are available across a plurality of social networking systems.

20. The system of claim 14, wherein an AR element of the one or more AR elements enhances an emotive expression of the second user.

* * * * *